(12) United States Patent
Lin

(10) Patent No.: US 12,435,811 B2
(45) Date of Patent: Oct. 7, 2025

(54) TWO-WAY DRIVING DEVICE FOR USE WITH VALVE COMPONENT

(71) Applicant: KING LAI HYGIENIC MATERIALS CO., LTD., Zhubei (TW)

(72) Inventor: Cheng-Chi Lin, Taichung (TW)

(73) Assignee: KING LAI HYGIENIC MATERIALS CO., LTD, Hsinchu County (TW)

( * ) Notice: Subject to any disclaimer, the term of this patent is extended or adjusted under 35 U.S.C. 154(b) by 0 days.

(21) Appl. No.: 18/775,929

(22) Filed: Jul. 17, 2024

(65) Prior Publication Data

US 2025/0043883 A1 Feb. 6, 2025

(30) Foreign Application Priority Data

Aug. 2, 2023 (TW) ................................. 112128959

(51) Int. Cl.
*F16K 31/122* (2006.01)
(52) U.S. Cl.
CPC ............................. *F16K 31/1225* (2013.01)
(58) Field of Classification Search
CPC ...... F16K 31/1225; F16K 3/188; F16K 51/02; F16K 3/0254
See application file for complete search history.

(56) References Cited

U.S. PATENT DOCUMENTS

| | | | | |
|---|---|---|---|---|
| 6,776,394 B2* | 8/2004 | Lucas | ....................... | F16K 3/10 251/301 |
| 8,678,344 B2* | 3/2014 | Ehrne | ..................... | F16K 3/314 251/87 |
| 8,807,527 B2* | 8/2014 | Kim | ........................ | F16K 3/188 137/553 |
| 8,960,641 B2* | 2/2015 | Blecha | ..................... | F16K 3/18 251/158 |
| 10,184,570 B2* | 1/2019 | Bohm | ..................... | F16K 3/184 |
| 11,047,485 B2* | 6/2021 | Al-Jarallah | ........... | F16K 3/0254 |
| 2007/0272888 A1* | 11/2007 | Tichy | ........................ | F16K 3/18 251/63 |
| 2011/0175011 A1* | 7/2011 | Ehrne | ..................... | F16K 51/02 251/366 |

(Continued)

FOREIGN PATENT DOCUMENTS

TW I503914 B 10/2015
TW I730808 B 6/2021

*Primary Examiner* — Umashankar Venkatesan
(74) *Attorney, Agent, or Firm* — Birch, Stewart, Kolasch & Birch, LLP

(57) ABSTRACT

A two-way driving device for use with a valve component includes: a body; a pneumatic sleeve disposed in the body and being movable upward and downward; an axle disposed partially in the pneumatic sleeve, movable forward and backward, and connected to at least one transverse piston movable forward and backward; a first gas duct for admitting a gas to drive the pneumatic sleeve upward; a second gas duct for admitting a gas to drive the transverse piston moving forward and drive the axle ascending and moving transversely; a third gas duct for admitting a gas to drive the transverse piston moving backward; and a fourth gas duct for admitting a gas to drive the pneumatic sleeve downward and drive the axle retracting transversely and descending.

17 Claims, 21 Drawing Sheets

(56) References Cited

U.S. PATENT DOCUMENTS

2016/0003363 A1* 1/2016 Blecha ................. F16K 3/0254
  251/326
2017/0009892 A1* 1/2017 Ehrne ................... F16K 3/0254
2021/0388908 A1* 12/2021 Lin ..................... F16K 31/1226

* cited by examiner

TWO-WAY DRIVING DEVICE FOR USE WITH VALVE COMPONENT

BACKGROUND OF THE INVENTION

1. Field of the Invention

The present disclosure relates to gate valves, and more particularly to a two-way driving device for use with a valve component.

2. Description of Related Art

Taiwan's patent I503914 discloses a two-way valve that uses a first driving unit to operate a first operator and uses a second driving unit to operate a second operator in order for its push-pull module to undergo leftward or rightward displacement, allowing a first seal plate or a second seal plate to hermetically seal two inlets selectively.

Taiwan's patent I503914 has drawbacks as follows: complicated mechanisms, intricate and assembly-unfriendly parts and components, and low operation precision.

Taiwan's patent I730808 discloses a valve component driving device capable of undergoing two-way movement not only through two piston rods coordinating with two flow channels designed to achieve pushing and retracting movements but also through two guide rods coordinating with valve cylinder piston rods.

Despite its simple mechanisms, the aforesaid prior art is disadvantaged by the mere two flow paths, and in consequence the pushing and retracting movements are frozen sometimes. As a result, the prior art still has room for improvement.

BRIEF SUMMARY OF THE INVENTION

It is an objective of the disclosure to provide a two-way driving device for use with a valve component such that the valve component is driven to move in two directions without getting frozen.

Another objective of the disclosure is to provide a two-way driving device for use with a valve component to allow the valve component to ascend and then move transversely while being pushed and to retract transversely and then descend while being retracted, thereby achieving sequential movement.

To achieve the above and other objectives, the disclosure provides a two-way driving device for use with a valve component, comprising: a body having a vertical channel extending upward and downward, at least one transverse piston cavity extending forward and backward, at least one auxiliary piston cavity extending upward and downward, and a sub-channel extending forward and backward, the vertical channel being defined by a vertical channel wall, the at least one transverse piston cavity having therein a transverse piston movable between a forwarding position and a backing position, the sub-channel having therein a sub seal ring and being in communication with the at least one transverse piston cavity, the transverse piston having a sub-piston protruding into the sub-channel via a rear end thereof and slidingly penetrating the sub-channel because of the sub seal ring fitted around the sub-piston, and the vertical channel wall having a lower seal ring; a pneumatic sleeve having therein an oblong hollow core, having at least one auxiliary piston protruding upward into the at least one auxiliary piston cavity, disposed in the vertical channel, and being movable between a highest position and a lowest position, with the lower seal ring slidingly fitted around the pneumatic sleeve, with a gap formed between the pneumatic sleeve and the vertical channel wall to admit a gas, with a middle seal ring disposed annularly at the pneumatic sleeve, pressing against the vertical channel wall, and being higher than the lower seal ring; an axle disposed partially in the pneumatic sleeve and movable forward and backward to ascend or descend together with the pneumatic sleeve, wherein the axle has an exposed segment exposed from the pneumatic sleeve and the body from above; a transverse movement block fixedly disposed at the transverse piston in the at least one transverse piston cavity and thus movable forward and backward together with the transverse piston in the body, with the axle being capable of movably penetrating upward and downward the transverse movement block and thus moving forward and backward together with the transverse movement block; a first gas duct disposed at the body, having an end defined as an outer end in communication with an outside of the body, having another end defined as an inner end in communication with the vertical channel, wherein the inner end of the first gas duct is lower than the middle seal ring when the pneumatic sleeve is at the lowest position; a second gas duct disposed at the body, having an end defined as a lower end in communication with the vertical channel, having another end defined as an upper end in communication with a space between the body and a rear of the transverse piston in the at least one transverse piston cavity, wherein the lower end of the second gas duct is lower than the lower seal ring; a third gas duct disposed at the body, having an end defined as a front end in communication with a space between the body and a front of the transverse piston in the at least one transverse piston cavity, and having another end defined as an outer end in communication with the outside of the body; a fourth gas duct disposed at the body, having an end defined as an upper end in communication with a front end of the sub-channel, having another end defined as a lower end in communication with the at least one auxiliary piston cavity, wherein the lower end of the fourth gas duct is higher than the at least one auxiliary piston when the pneumatic sleeve is at the highest position; and a pressure relief valve disposed at the body and being in communication with the outside of the body and the second gas duct, wherein the pneumatic sleeve has a trigger slot concavely formed and spatially in communication with the gap above the lower seal ring and a space below the lower seal ring so as to be in communication with the lower end of the second gas duct when the pneumatic sleeve is at the highest position, wherein the sub-piston has a sub trigger slot concavely formed and spatially in communication with the at least one transverse piston cavity behind the sub seal ring and the upper end of the fourth gas duct when the transverse piston in the at least one transverse piston cavity is at the backing position.

Owing to the aforesaid technical features, the disclosure is effective in driving an externally-connected valve component in two directions and preventing frozen movements thereof. Furthermore, the disclosure requires the axle to ascend and then move transversely while pushing the valve component, and requires the axle to retract transversely and then descend while retracting the valve component, thereby achieving sequential movement.

Furthermore, the disclosure dispenses with the at least one auxiliary piston cavity and the at least one auxiliary piston and has distinguishing technical features described below. The lower end of the fourth gas duct is in communication with the vertical channel instead. When the pneumatic sleeve is at the highest position, the lower end of the fourth gas duct is higher than the middle seal ring. Therefore, the aforesaid advantages can also be achieved.

DETAILED DESCRIPTION OF THE INVENTION

Figure 1:
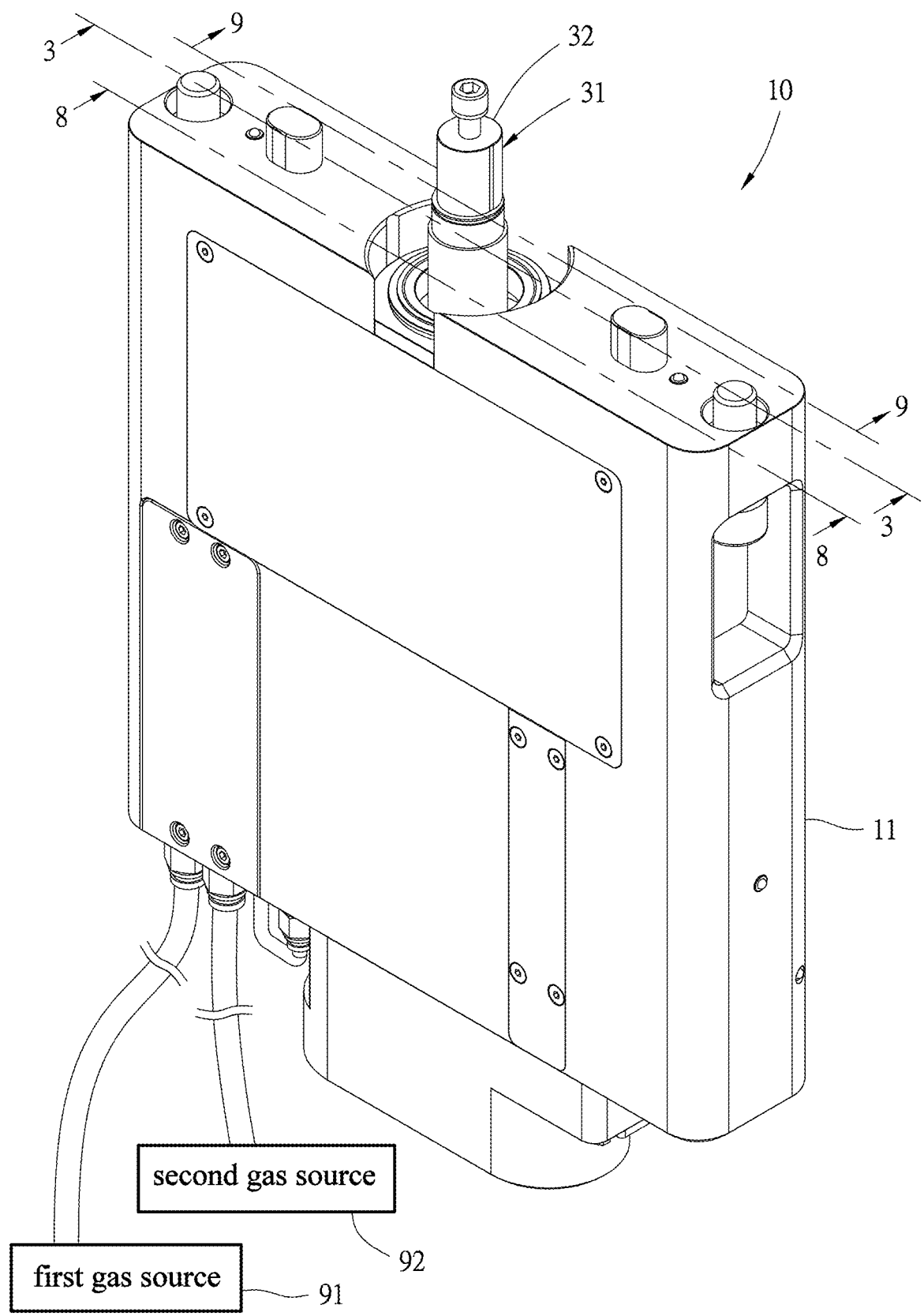
FIG. 1 is a three-dimensional view of the first preferred embodiment of the disclosure.

Technical features of the disclosure are herein illustrated with preferred embodiments, depicted with drawings, and described below.

Referring to FIG. 1 through FIG. 17, the first preferred embodiment of the disclosure provides a two-way driving device 10 for use with a valve component, essentially comprising a body 11, a pneumatic sleeve 21, an axle 31, a transverse movement block 41, a first gas duct 51, a second gas duct 52, a third gas duct 53, a fourth gas duct 54 and a pressure relief valve 61.

Figure 2:
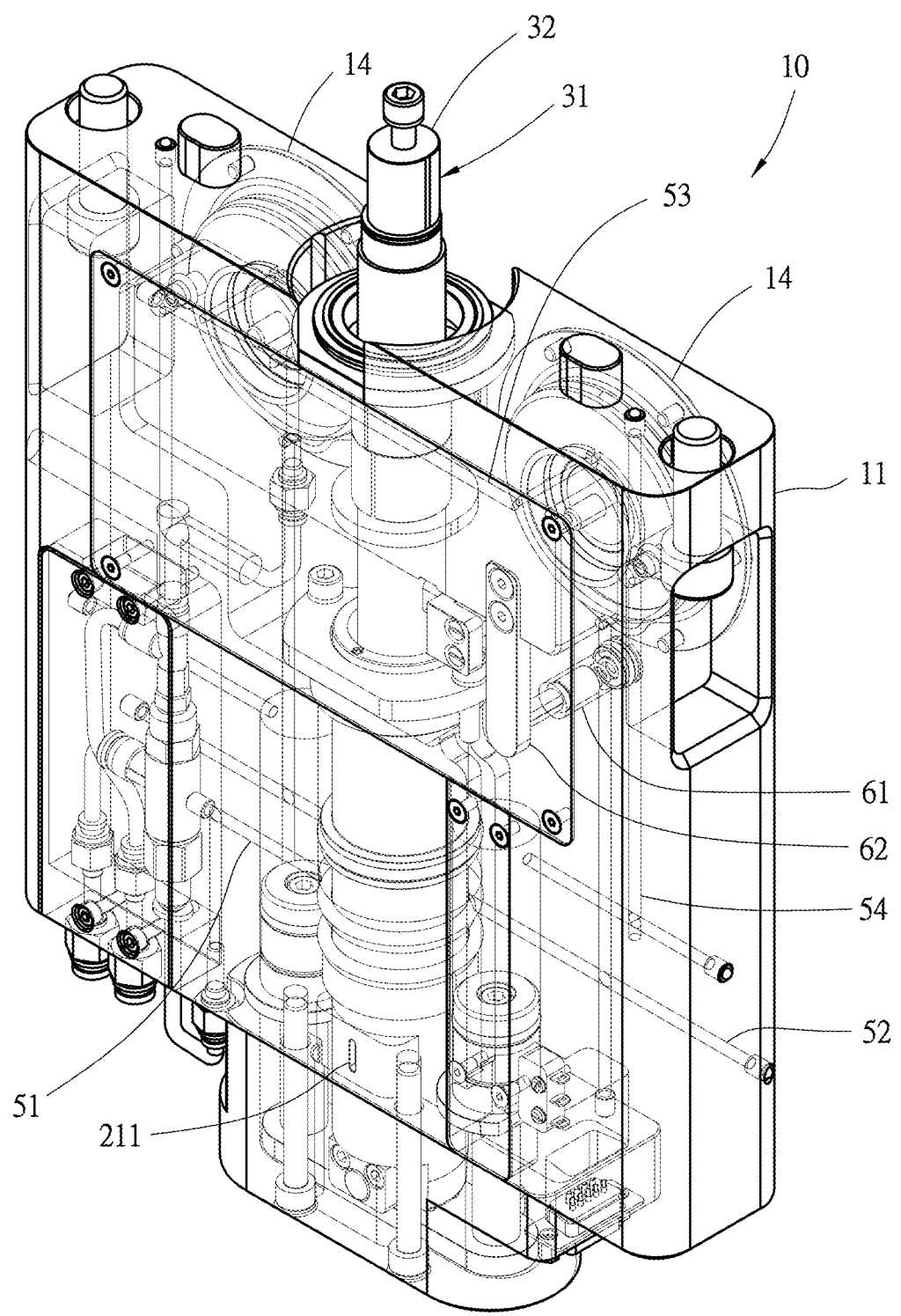
FIG. 2 is a perspective view of the first preferred embodiment of the disclosure.

Regarding the accompanying drawings, FIG. 2 is a perspective view that shows the first gas duct 51, the second gas duct 52, the third gas duct 53 and the fourth gas duct 54. Since the perspective view looks intricate, the first gas duct 51, the second gas duct 52, the third gas duct 53 and the fourth gas duct 54 are shown in FIG. 4 through FIG. 7 respectively.

The body 11 has a vertical channel 12 extending upward and downward, two transverse piston cavities 14 extending forward and backward, and two auxiliary pistons cavities 16 extending upward and downward. The vertical channel 12 is defined by a vertical channel wall 121. Each transverse piston cavity 14 has therein a transverse piston 15 movable between a forwarding position FP and a backing position BP. The body 11 further has two sub-channels 141 extending forward and backward and being in communication with the transverse piston cavities 14 respectively. The sub-channels 141 each have therein a sub seal ring 142. The transverse pistons 15 each have a sub-piston 151. The sub-pistons 151 protrude into the sub-channels 141 via the rear ends thereof and slidingly penetrate the sub-channels 141 to maintain airtightness because of the sub seal ring 142 fitted around the sub-pistons 151. The vertical channel wall 121 has a lower seal ring 191. In the first embodiment, the vertical channel wall 121 has an upper shoulder portion 123 protruding inward and has a bottom seal ring 192 disposed below the lower seal ring 191. The upper shoulder portion 123 functions as an upper endpoint.

The pneumatic sleeve 21 is disposed in the vertical channel 12. The lower seal ring 191 and the bottom seal ring 192 are slidingly fitted around the pneumatic sleeve 21. The pneumatic sleeve 21 has therein an oblong hollow core and is movable between a highest position HP and a lowest position LP. A gap 22 is formed between the pneumatic sleeve 21 and the vertical channel wall 121 to admit gas. A middle seal ring 24 is disposed annularly at the pneumatic sleeve 21, presses against the vertical channel wall 121, and is higher than the lower seal ring 191. The pneumatic sleeve 21 further has two auxiliary pistons 26 protruding upward into the two auxiliary pistons cavities 16 respectively. The two auxiliary pistons 26 connect to the pneumatic sleeve 21 and thus ascend and descend together with the pneumatic sleeve 21. In the first embodiment, the pneumatic sleeve 21 has an upper pressing portion 291 protruding outward and disposed in the gap 22. After the pneumatic sleeve 21 has ascended to the highest position HP, the upper pressing portion 291 presses against the upper shoulder portion 123. When the pneumatic sleeve 21 descends to the lowest position LP, the pneumatic sleeve 21 directly lands on the bottom of the body 11. The aforesaid termination of movements at the highest position HP and lowest position LP in the first embodiment is illustrative rather than restrictive of the claims of the disclosure.

The axle 31 is disposed partially in the pneumatic sleeve 21 and is movable forward and backward to ascend or descend together with the pneumatic sleeve 21. The axle 31 has an exposed segment 32 exposed from the pneumatic sleeve 21 and the body 11 from above. In the first embodiment, specifically speaking, a position-limiting rod 28 is fixedly disposed in the pneumatic sleeve 21, with the axle 31 being movably penetrated by the position-limiting rod 28 to move forward and backward along the position-limiting rod 28 and in the pneumatic sleeve 21 and ascend or descend together with the pneumatic sleeve 21 while being acted on by the position-limiting rod 28. The two transverse pistons 15 flank the axle 31. The top end of the exposed segment 32 of the axle 31 is connected to a valve plug (not shown), allowing the valve plug to plug up or not to plug up a valve port (not shown). The valve plug and the valve port can be directly understood by studying the prior art and thus is not depicted by any diagrams of the accompanying drawings.

The transverse movement block 41 is fixedly disposed at the two transverse pistons 15 in the two transverse piston cavities 14 and thus is movable forward and backward together with the transverse pistons 15 in the body 11. The axle 31 is capable of movably penetrating upward and downward the transverse movement block 41 and thus moving forward and backward together with the transverse movement block 41.

The first gas duct 51 is disposed at the body 11. The first gas duct 51 has one end defined as an outer end 511 in communication with the outside of the body 11 and has the other end defined as an inner end 512 in communication with the vertical channel 12. When the pneumatic sleeve 21 is at the lowest position LP, the inner end 512 of the first gas duct 51 is lower than the middle seal ring 24 and higher than the lower seal ring 191. In the first embodiment, the outer end 511 of the first gas duct 51 is connected to a first gas source 91, and the first gas source 91 provides a gas.

The second gas duct 52 is disposed at the body 11. The second gas duct 52 has one end defined as a lower end 521 in communication with the vertical channel 12. The lower end 521 of the second gas duct 52 is lower than the lower seal ring 191 but higher than the bottom seal ring 192. The other end of the second gas duct 52 is branched into two ends defined as upper ends 522 in communication with the space between the body 11 and the rear of each of the transverse pistons 15 in the two transverse piston cavities 14.

The third gas duct 53 is disposed at the body 11. One end of the third gas duct 53 is branched into two ends defined as front ends 531 in communication with the space between the body 11 and the front of each of the two transverse pistons 15 in the two transverse piston cavities 14. The other end of the third gas duct 53 is defined as an outer end 532 in communication with the outside of the body 11. In the first embodiment, the outer end 532 of the third gas duct 53 is connected to a second gas source 92, and the second gas source 92 provides a gas or receives a gas.

The fourth gas duct 54 is disposed at the body 11. The fourth gas duct 54 is divided into two segments. One end of one of the segments of the fourth gas duct 54 is defined as an upper end 541 in communication with the front ends of the two sub-channels 141. The other end of the other segment of the fourth gas duct 54 is defined as a lower end 542 in communication with the two auxiliary pistons cavities 16. When the pneumatic sleeve 21 is at the highest position HP, the lower end 542 of the fourth gas duct 54 is higher than the two auxiliary pistons 26.

The pressure relief valve 61 is disposed at the body 11 and is in communication with the outside of the body 11 and the second gas duct 52. In the first embodiment, the pressure relief valve 61 has a trigger 62. The trigger 62 is connected to the transverse pistons 15 to move forward and backward together with the transverse pistons 15. When the transverse pistons 15 are at the forwarding position FP, the trigger 62 does not trigger the pressure relief valve 61 and thus allows the pressure relief valve 61 to shut, preventing the second gas duct 52 from being in communication with the outside of the body 11. When the transverse pistons 15 are at the backing position BP, the trigger 62 triggers the pressure relief valve 61 and thus allows the pressure relief valve 61 to open, allowing the second gas duct 52 to be in communication with the outside of the body 11.

The pneumatic sleeve 21 has a trigger slot 211 concavely formed. When the pneumatic sleeve 21 is at the highest position HP, the trigger slot 211 is spatially in communication with the gap 22 above the lower seal ring 191 and the space below the lower seal ring 191 to thereby be in communication with the lower end 521 of the second gas duct 52. When the pneumatic sleeve 21 is at the lowest position LP, the trigger slot 211 is lower than the lower seal ring 191.

The sub-piston 151 has a sub trigger slot 152 concavely formed. When the transverse pistons 15 in the two transverse piston cavities 14 are at the backing position BP, the sub trigger slot 152 is spatially in communication with the transverse piston cavity 14 behind the sub seal ring 142 and the upper end 541 of the fourth gas duct 54.

In the first embodiment, the two auxiliary pistons 26 and the two transverse pistons 15 can also be each in the number of one instead of two; for example, one auxiliary piston 26 and one transverse piston 15 are also effective in achieving a gas-based drive, allowing manufacturers to determine the required numbers of the auxiliary pistons 26 and transverse pistons 15 according to the requirements for their volumes or pushing forces. The scenario of one auxiliary piston 26 and one transverse piston 15 can be directly understood by studying the accompanying drawings and thus is not depicted by any diagrams of the accompanying drawings.

The structural features of the first embodiment are described above. The operation of the first embodiment is described below.

Figure 3:
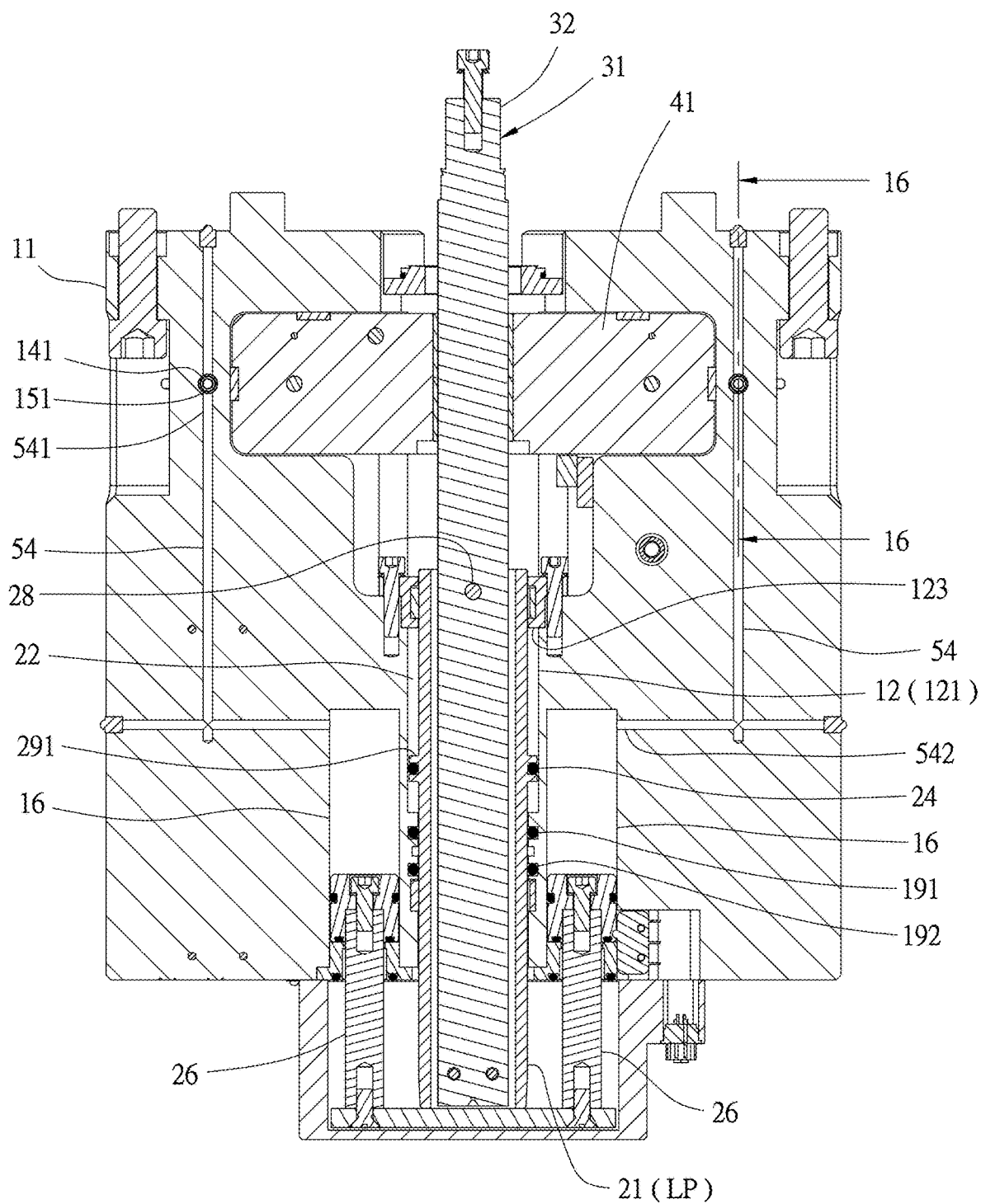
FIG. 3 is a cross-sectional view taken along line 3-3 of FIG. 1.
Figure 12:
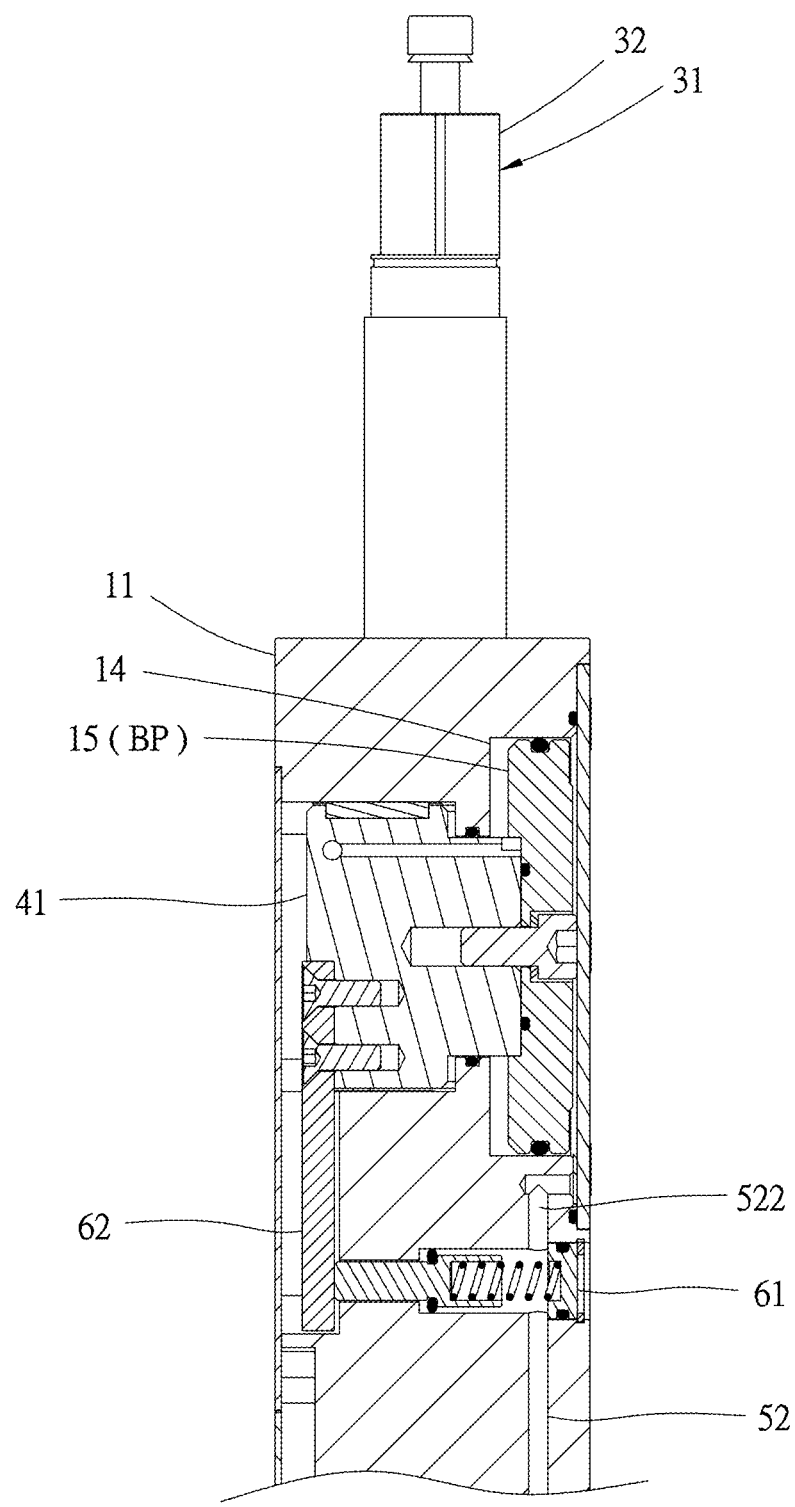
FIG. 12 is a cross-sectional view taken along line 12-12 of FIG. 10.
Figure 13:
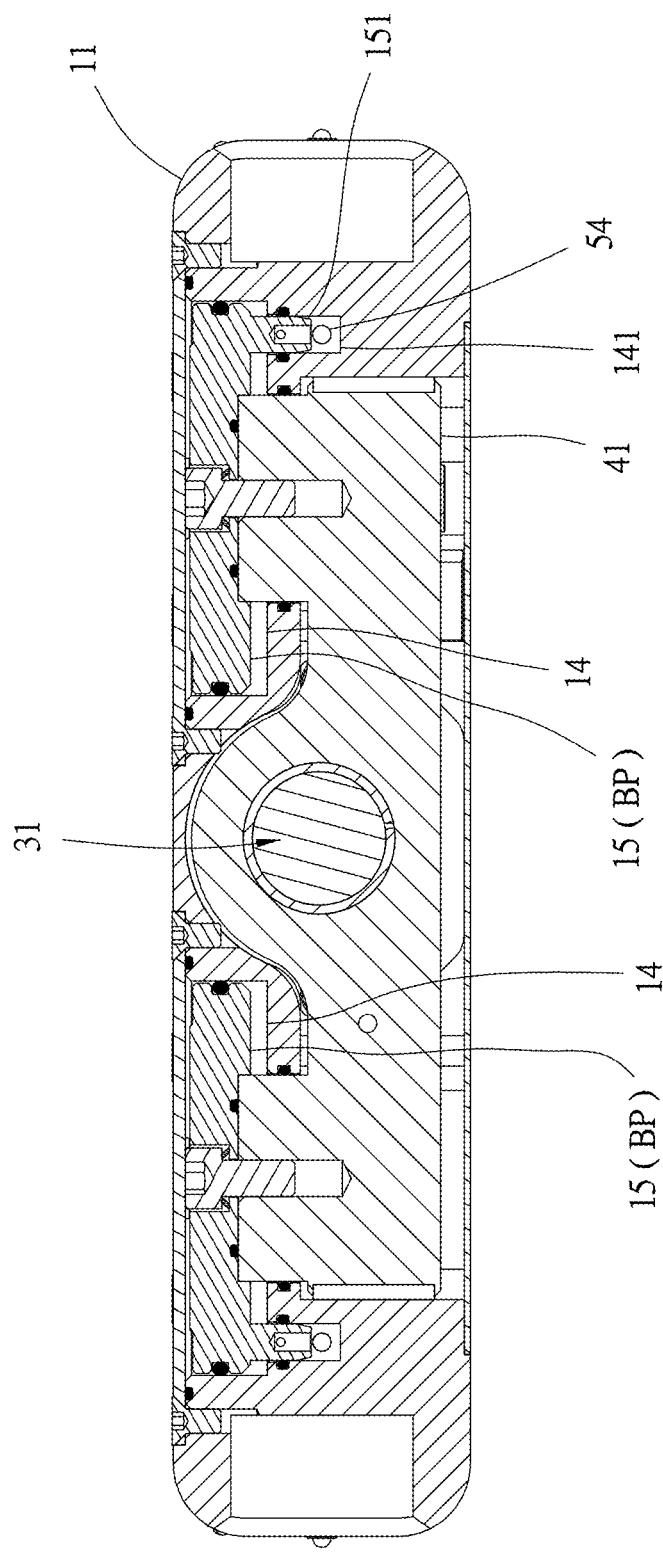
FIG. 13 is a cross-sectional view taken along line 13-13 of FIG. 10.

As shown in FIG. 3 and FIG. 12, prior to the commencement of their movements, the pneumatic sleeve 21 is at the lowest position LP, and the two transverse pistons 15 are at the backing position BP.

Figure 4:
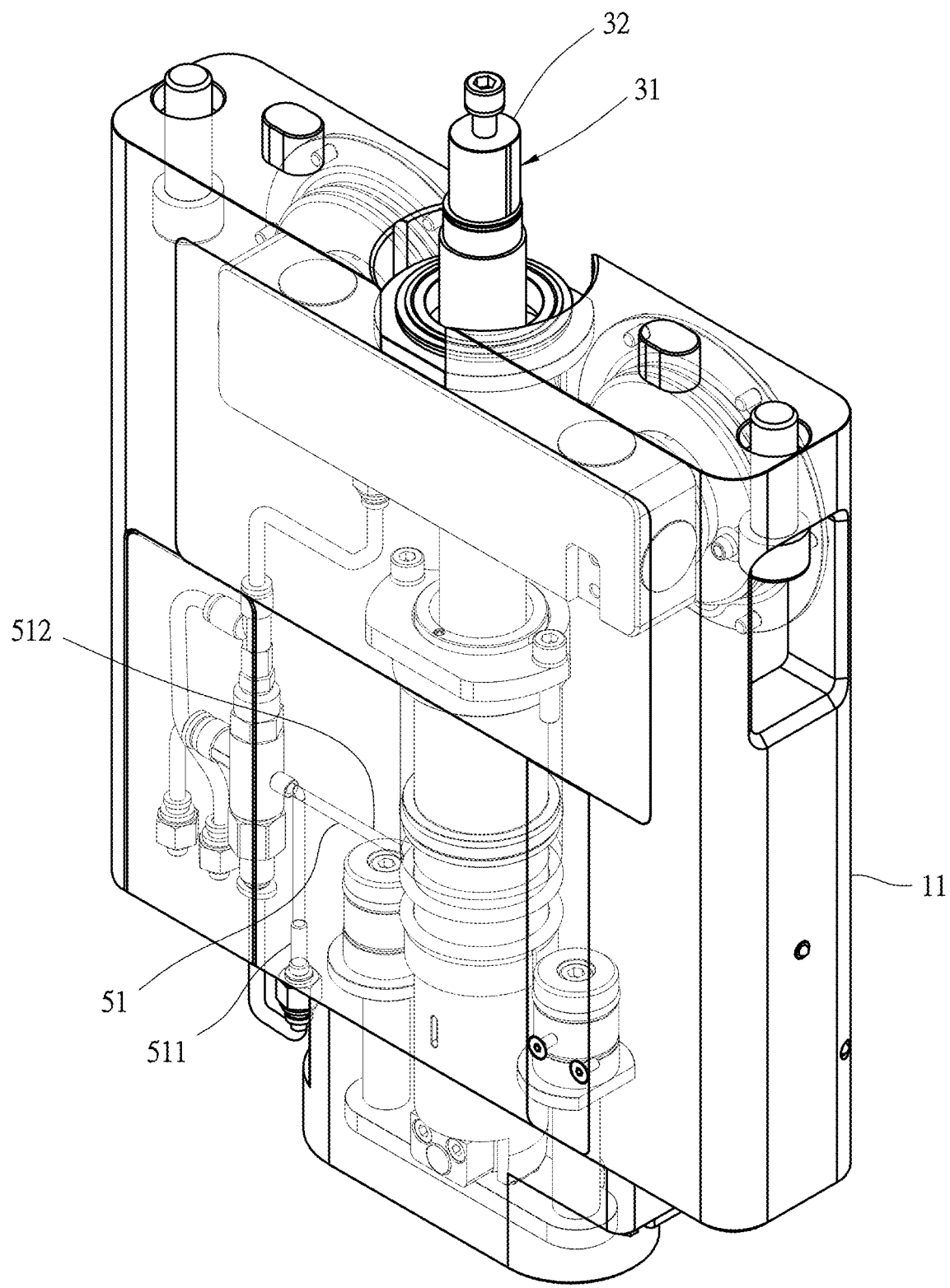
FIG. 4 is a partial perspective view of the first preferred embodiment of the disclosure, showing a first gas duct.
Figure 5:
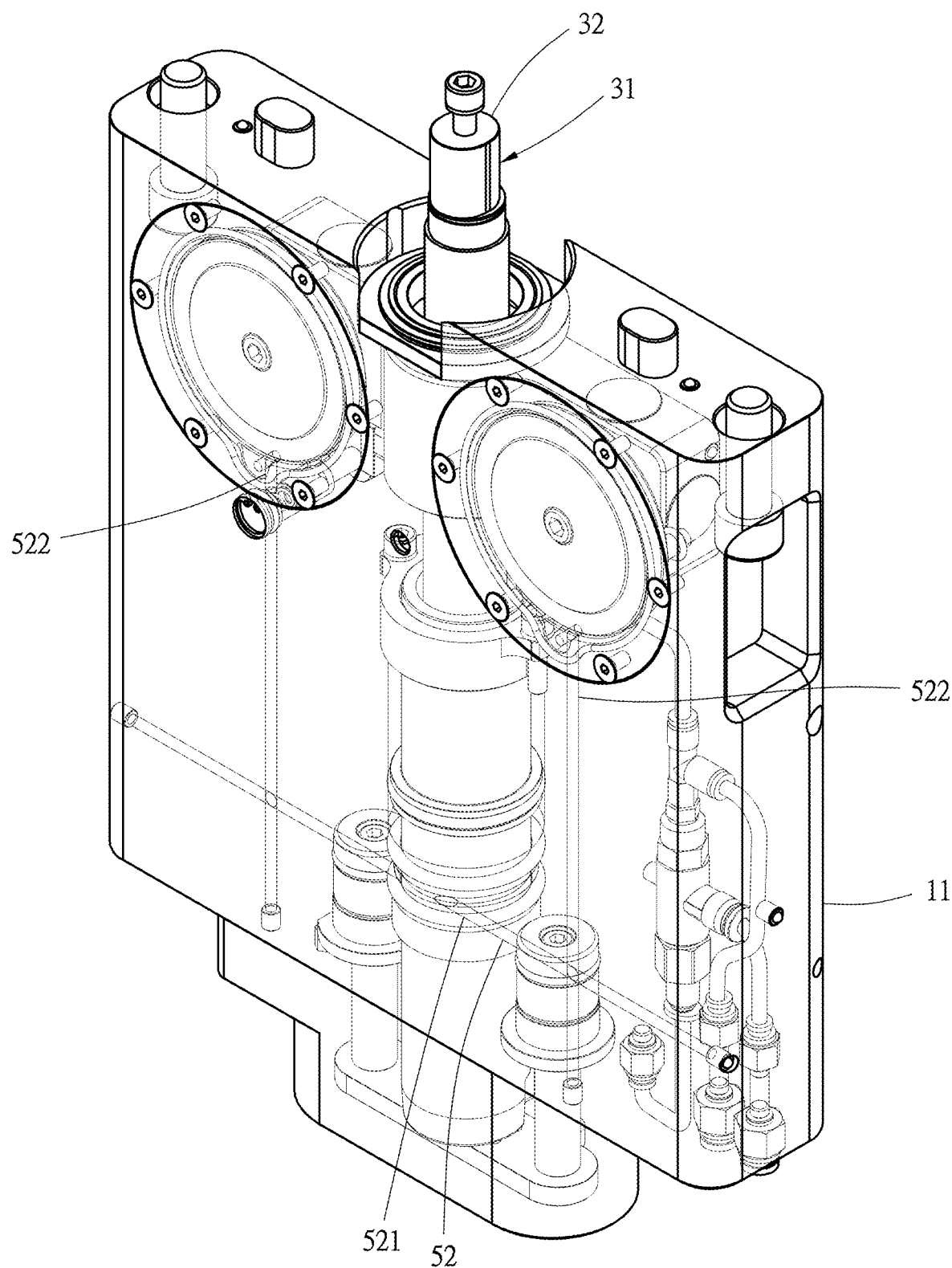
FIG. 5 is a partial perspective view of the first preferred embodiment of the disclosure, showing a second gas duct.
Figure 6:
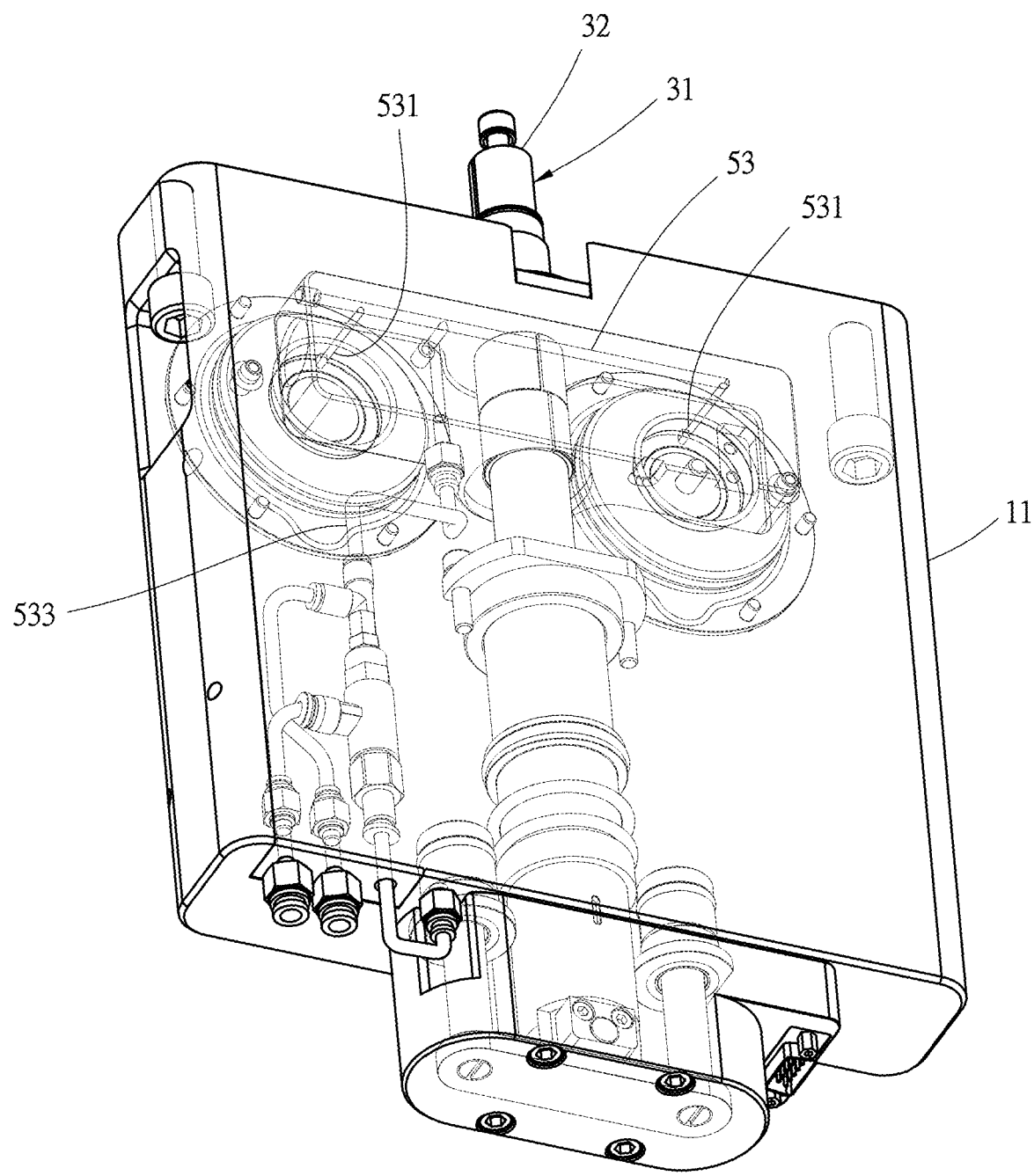
FIG. 6 is a partial perspective view of the first preferred embodiment of the disclosure, showing a third gas duct.
Figure 7:
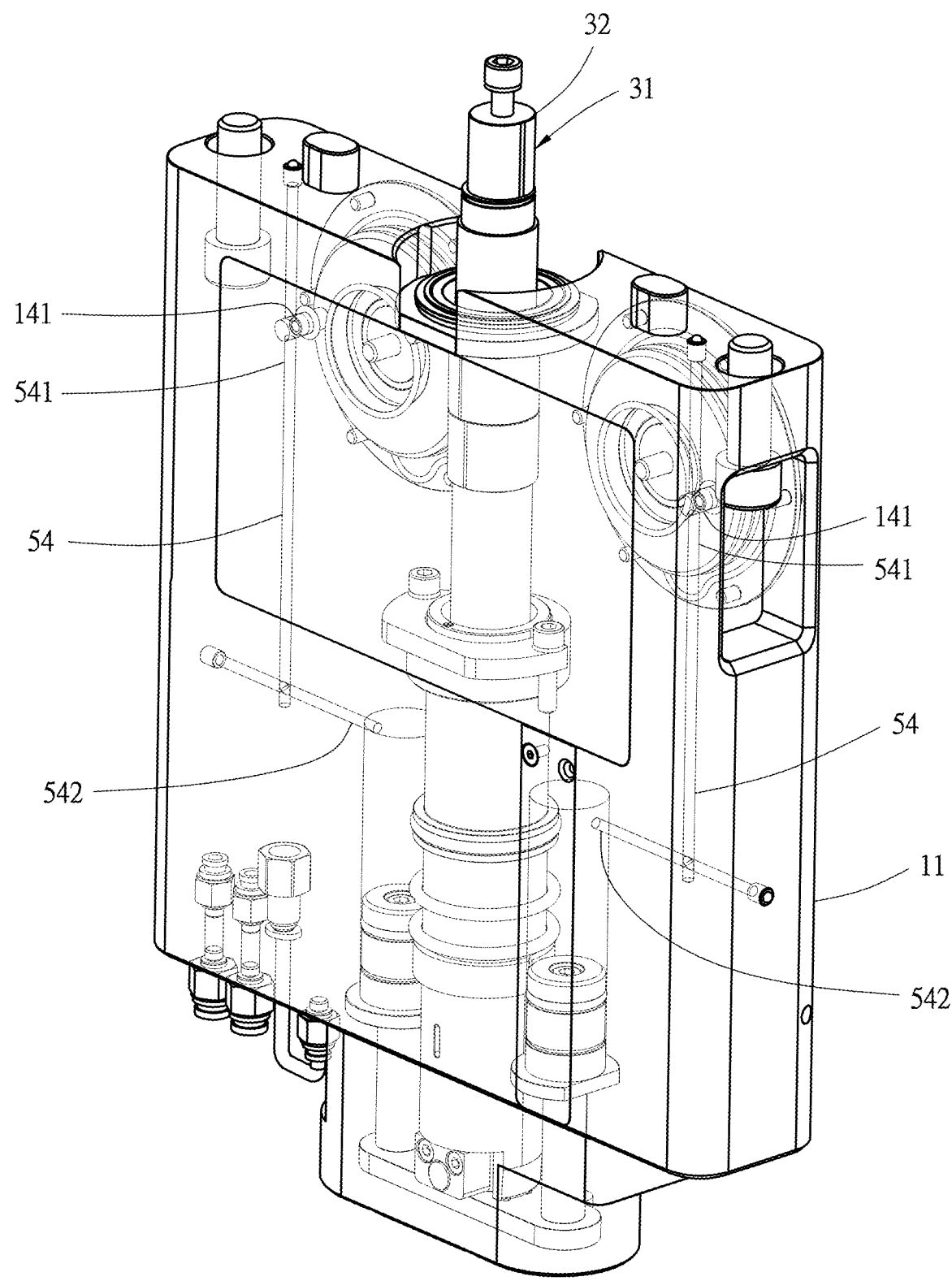
FIG. 7 is a partial perspective view of the first preferred embodiment of the disclosure, showing a fourth gas duct.
Figure 8:
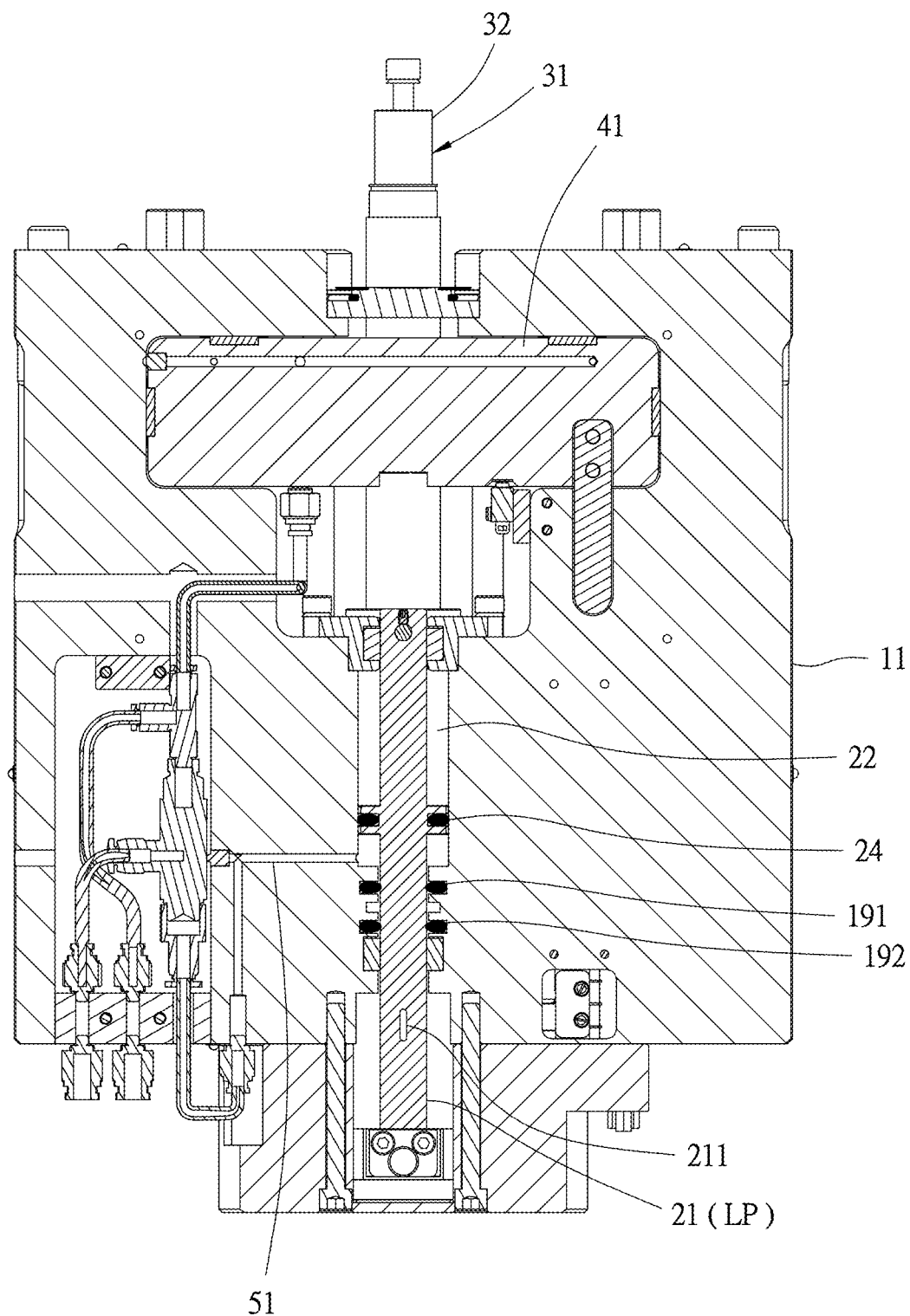
FIG. 8 is a cross-sectional view taken along line 8-8 of FIG. 1.
Figure 9:
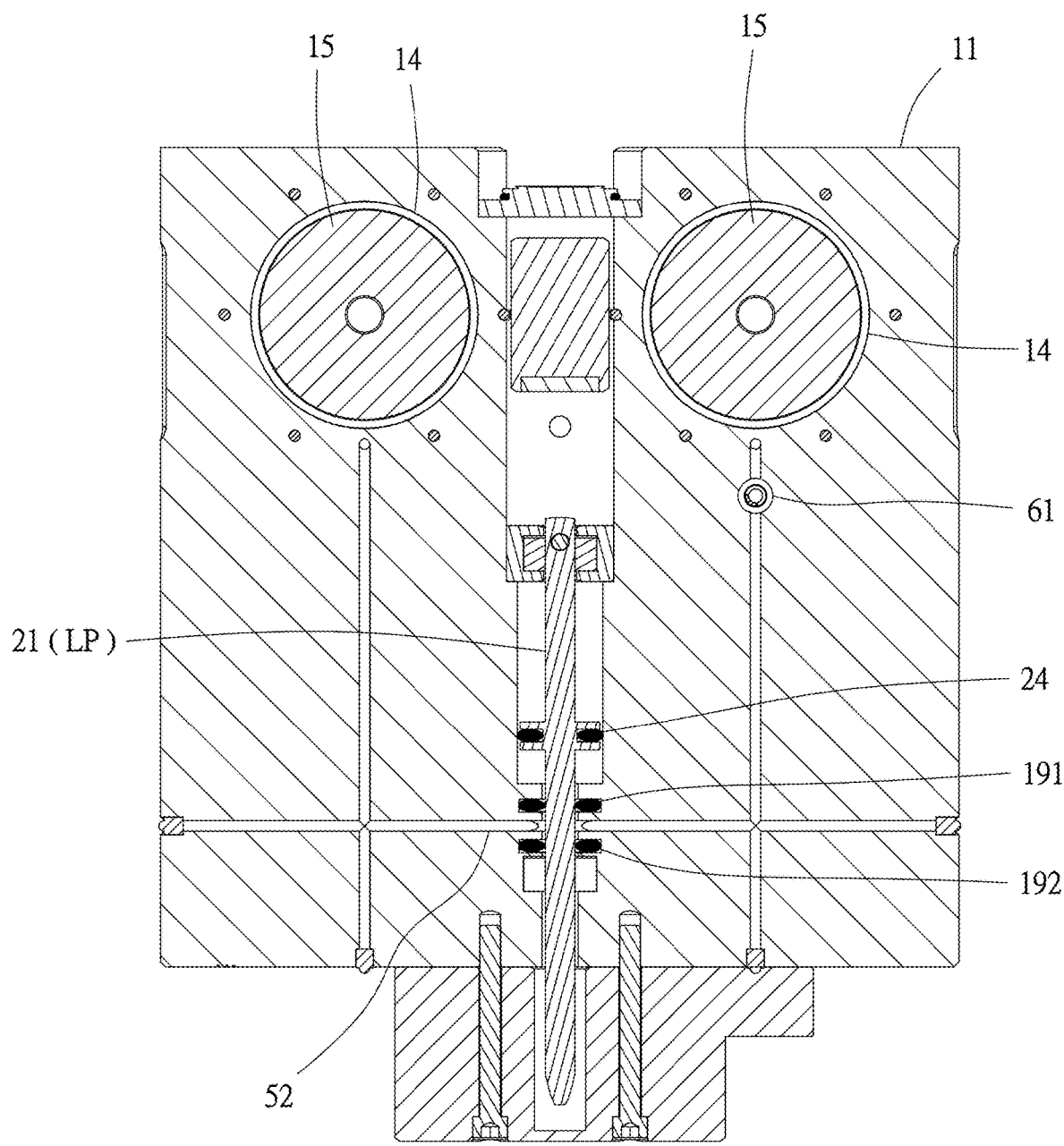
FIG. 9 is a cross-sectional view taken along line 9-9 of FIG. 1.
Figure 10:
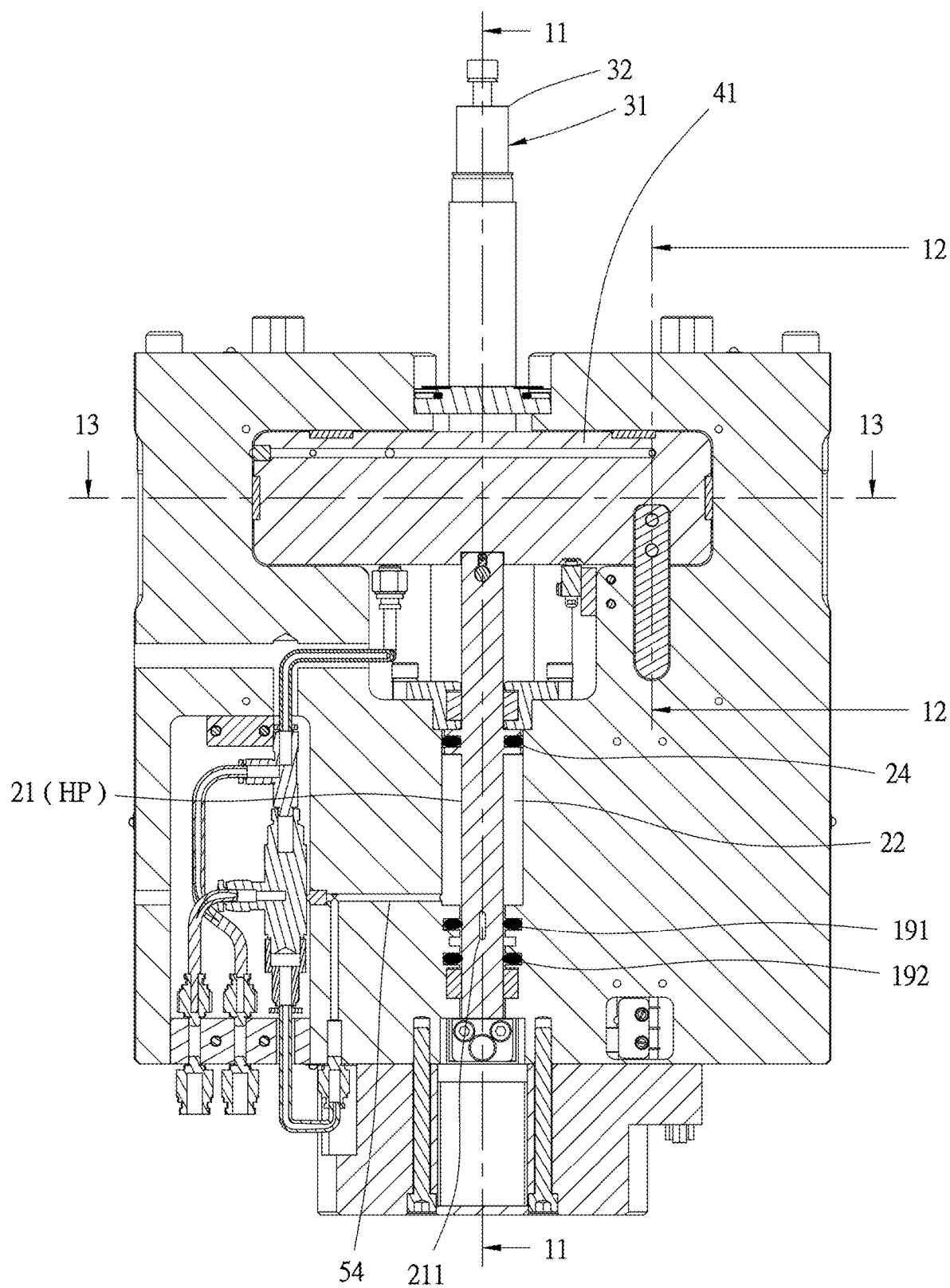
FIG. 10 is a schematic view of the operation of the first preferred embodiment of the disclosure.
Figure 11:
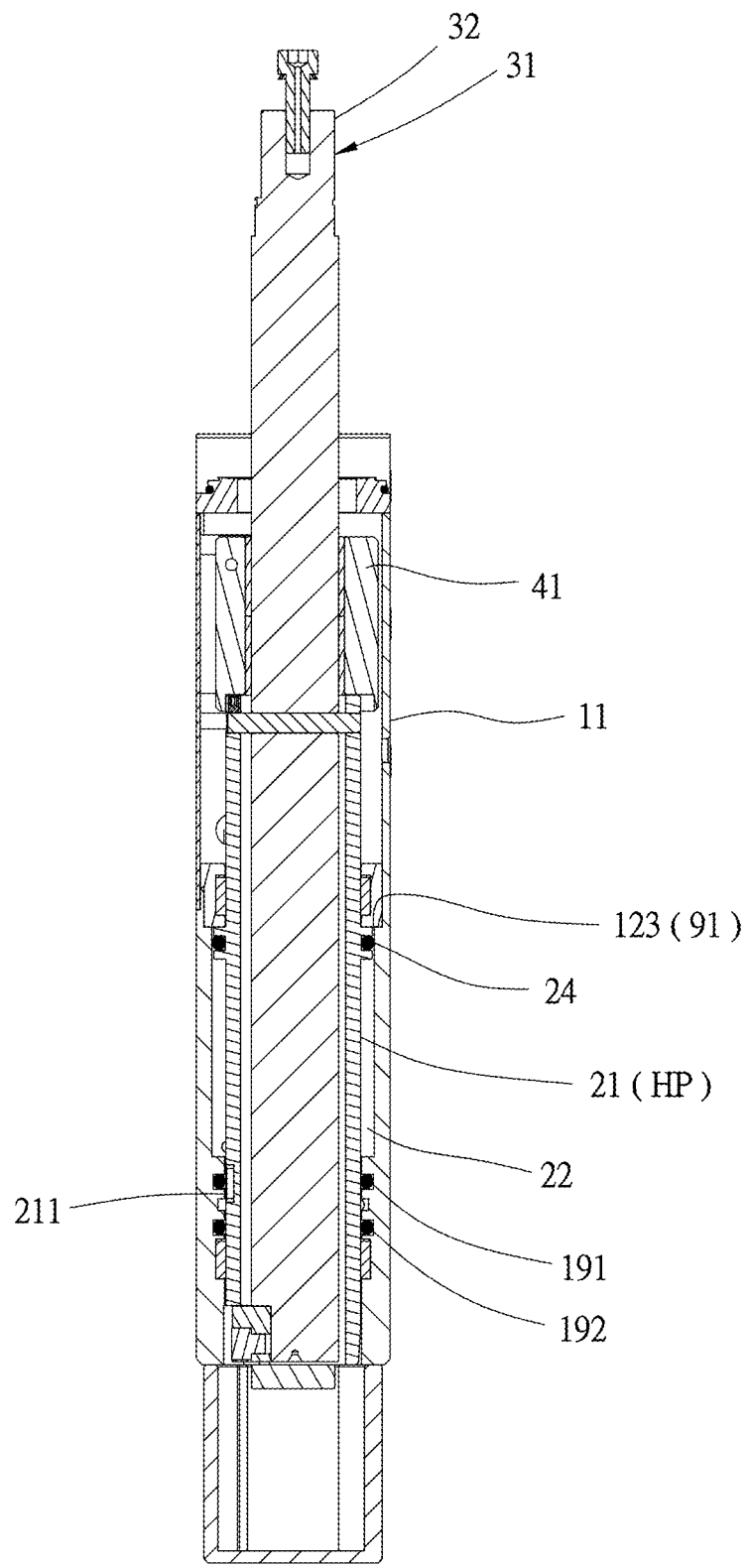
FIG. 11 is a cross-sectional view taken along line 11-11 of FIG. 10.
Figure 14:
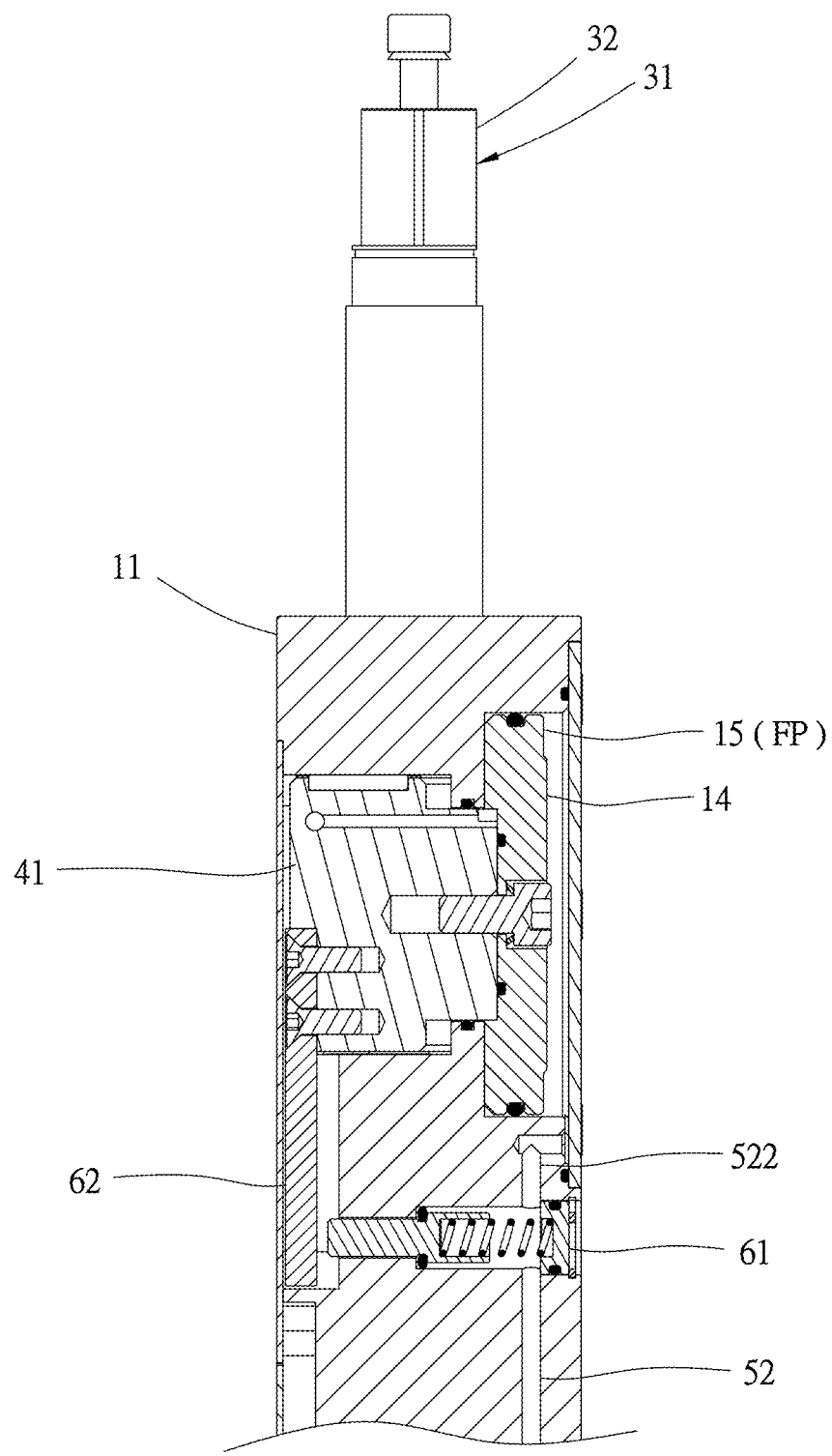
FIG. 14 is a schematic view depicting movements similar to FIG. 12.
Figure 15:
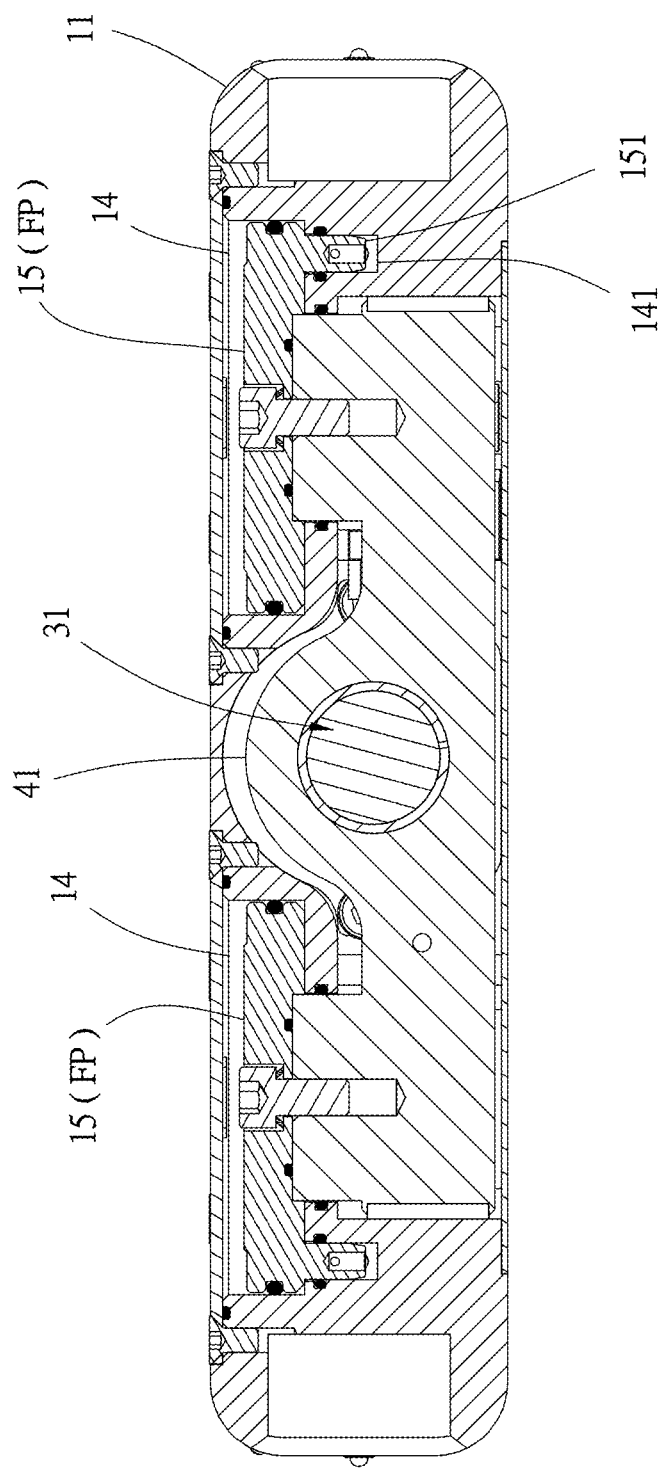
FIG. 15 is a schematic view depicting movements similar to FIG. 13.

As shown in FIG. 4, to start the sealing process, i.e., to insert the valve plug (not shown) disposed at the axle 31 into the valve port (not shown), it is necessary for the first gas source 91 (shown in FIG. 1) to provide a gas (not shown) to be admitted into the first gas duct 51. As shown in FIG. 8, the gas admitted into the first gas duct 51 enters the gap 22 to drive the pneumatic sleeve 21, the axle 31 and the two auxiliary pistons 26 ascending to the highest position HP as shown in FIG. 10. As shown in FIG. 11, when the pneumatic sleeve 21 is at the highest position HP, the trigger slot 211 is spatially in communication with the gap 22 above the lower seal ring 191 and the space below the lower seal ring 191, allowing the gas to enter the second gas duct 52 via the first gas duct 51. As shown in FIG. 9 and FIGS. 11-13, the gas enters the pressure relief valve 61 and the space between the body 11 and the rear of each of the two transverse pistons 15 in the two transverse piston cavities 14 via the second gas duct 52, pushing the two transverse pistons 15 forwards. Although the gas escapes from the pressure relief valve 61, it will still be feasible for the gas to push the two transverse pistons 15, provided that the amount of the entering gas is greater than the amount of the escaping gas. At this point in time, the air between the body 11 and the front of each of the two transverse pistons 15 flows to the second gas source 92 via the third gas duct 53. As shown in FIGS. 14 and 15, the two transverse pistons 15 are pushed to reach the forwarding position FP and advance no more thereafter, whereas the transverse movement block 41 and the axle 31 move forward together with the two transverse pistons 15 to reach a point from which no more advance is possible. At this point in time, the axle 31 has finished performing the two-way movement that involves ascending followed by moving forward, allowing the valve plug (not shown) at the axle 31 to be fitted to the valve port (not shown) to seal it. During the ascent of the two auxiliary pistons 26, the air in the two auxiliary pistons cavities 16 is compressed to enter the fourth gas duct 54 and then enter the two sub-channels 141 before entering the two transverse piston cavities 14.

Figure 16:
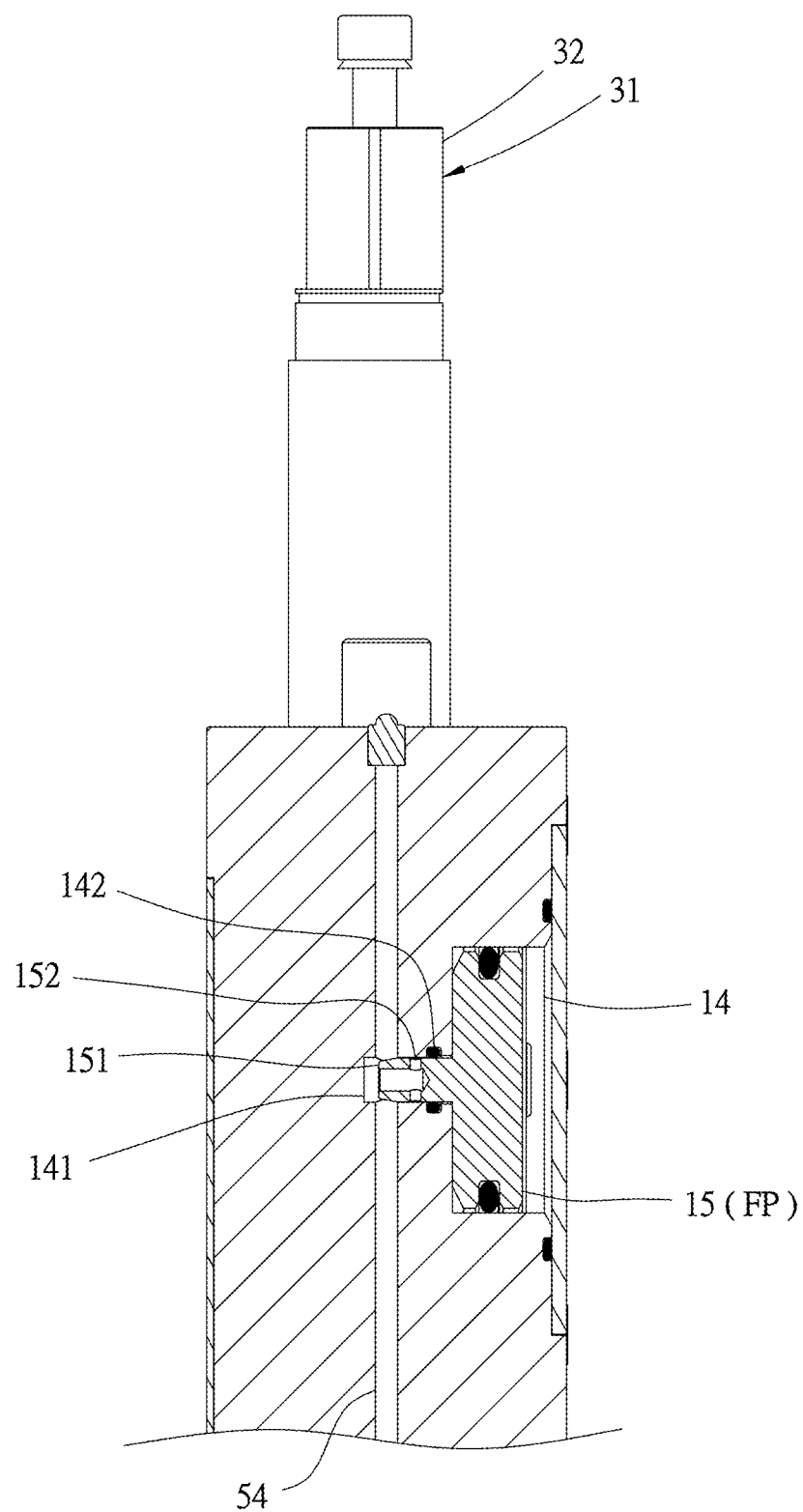
FIG. 16 is a cross-sectional view taken along line 16-16 of FIG. 3.
Figure 17:
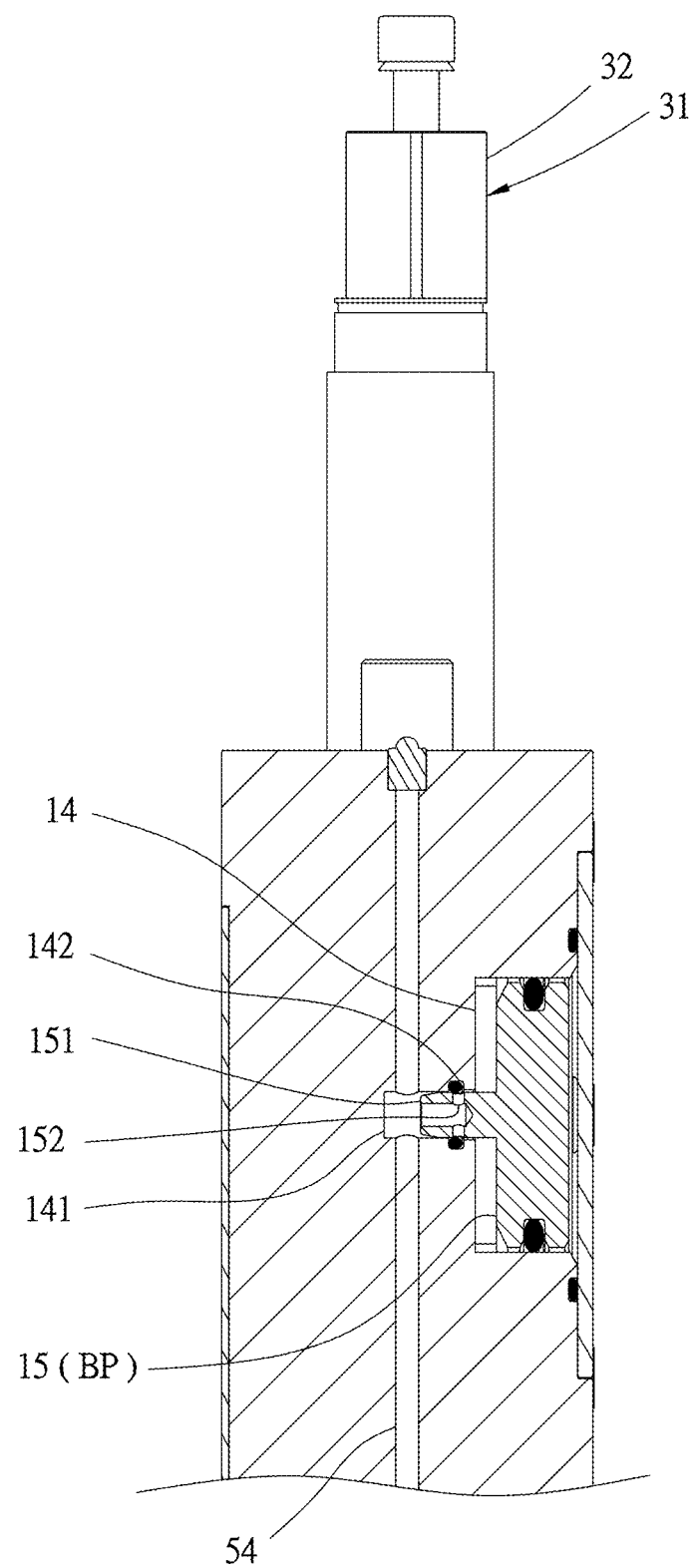
FIG. 17 is a schematic view depicting movements similar to FIG. 16.
Figure 18:
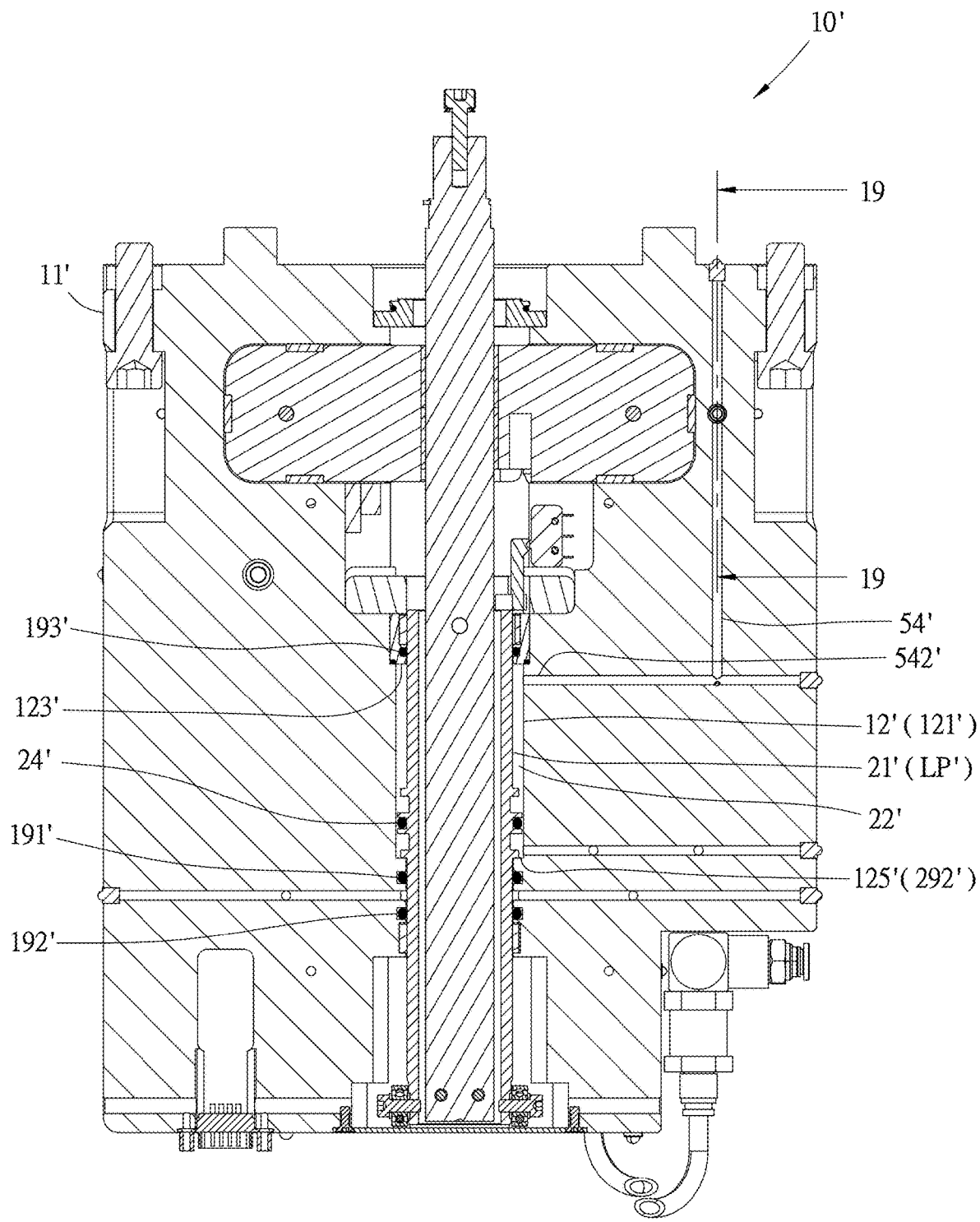
FIG. 18 is a cross-sectional view of the second preferred embodiment of the disclosure.
Figure 19:
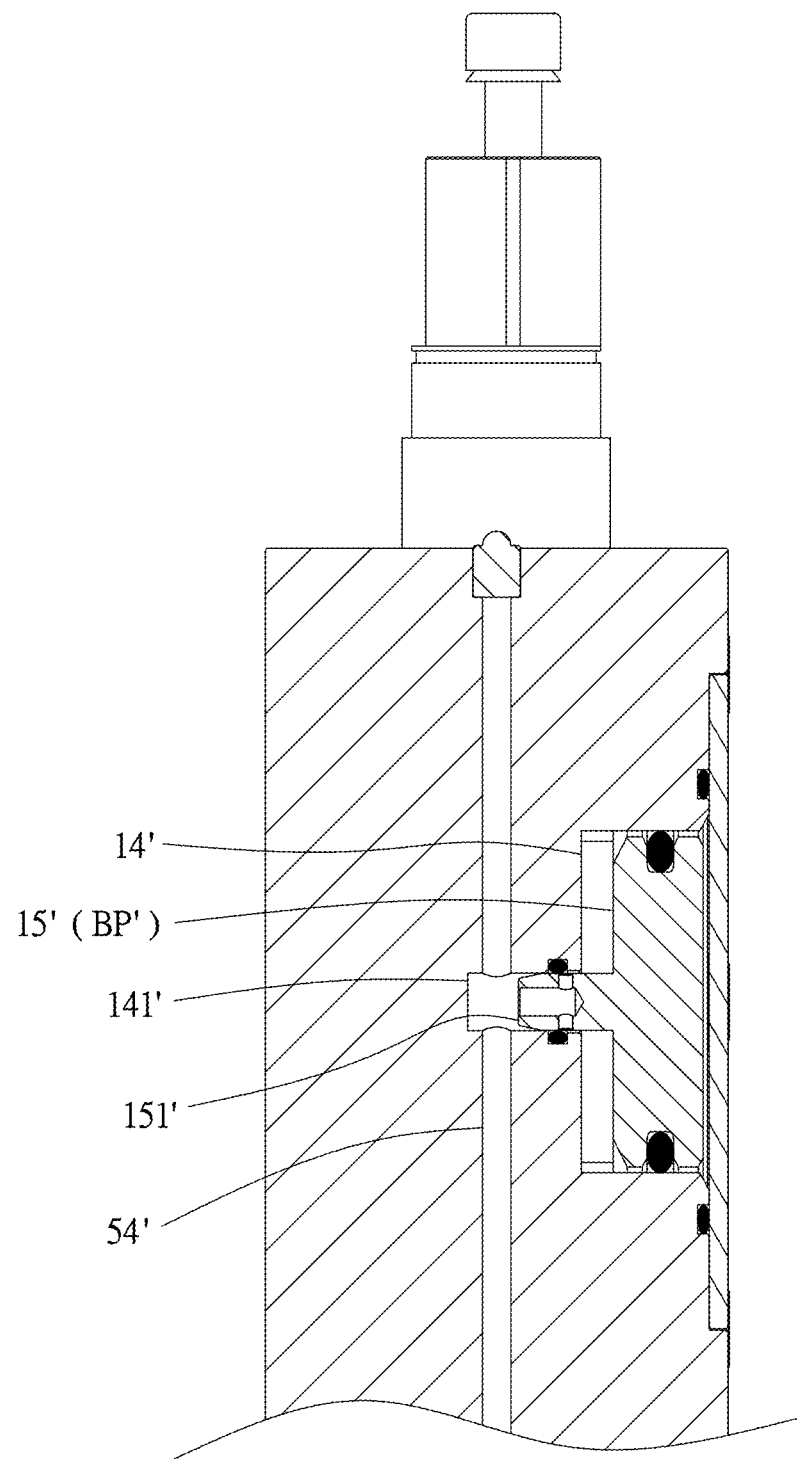
FIG. 19 is a cross-sectional view taken along line 19-19 of FIG. 18.
Figure 20:
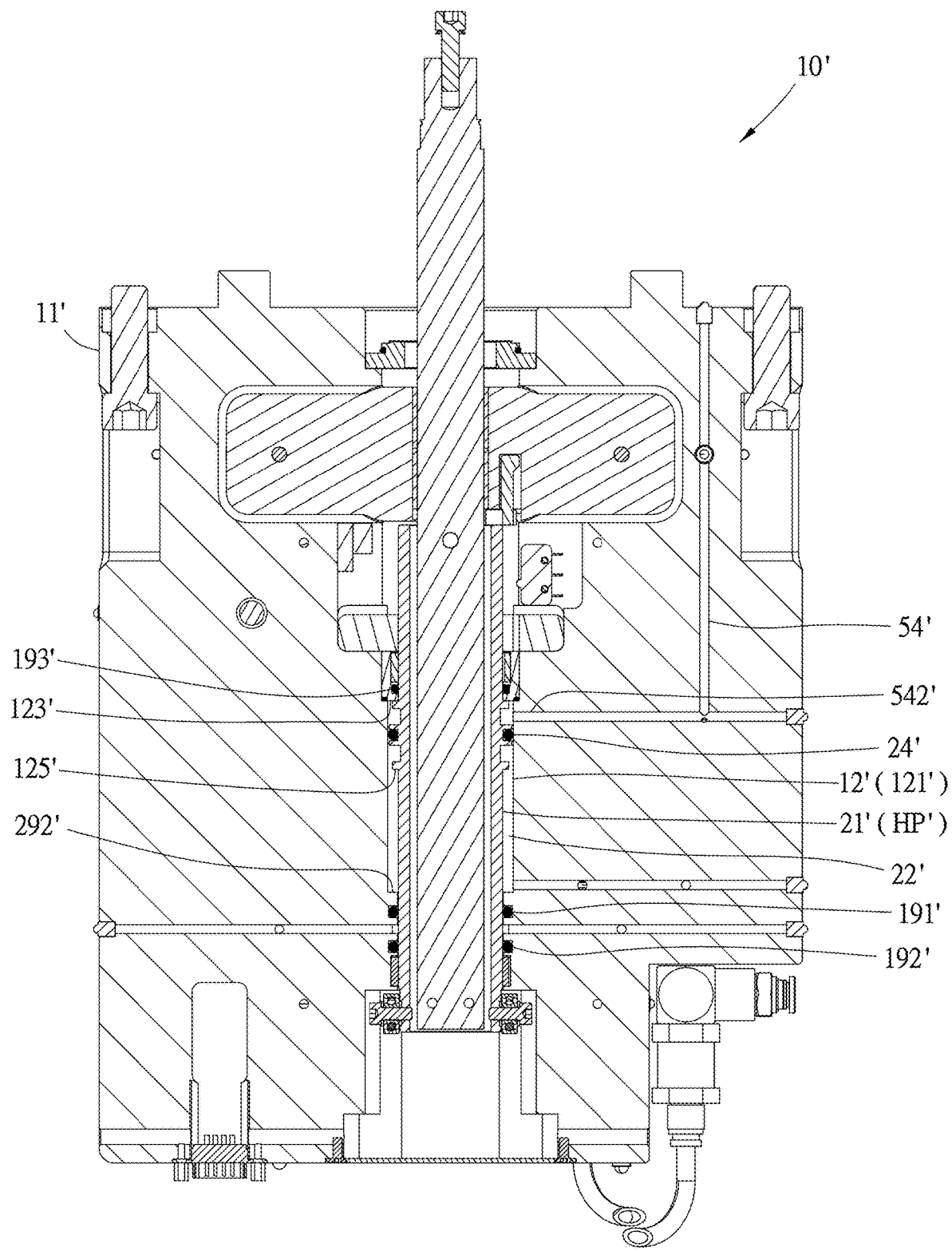
FIG. 20 is a cross-sectional view of the operation of the second preferred embodiment of the disclosure.
Figure 21:
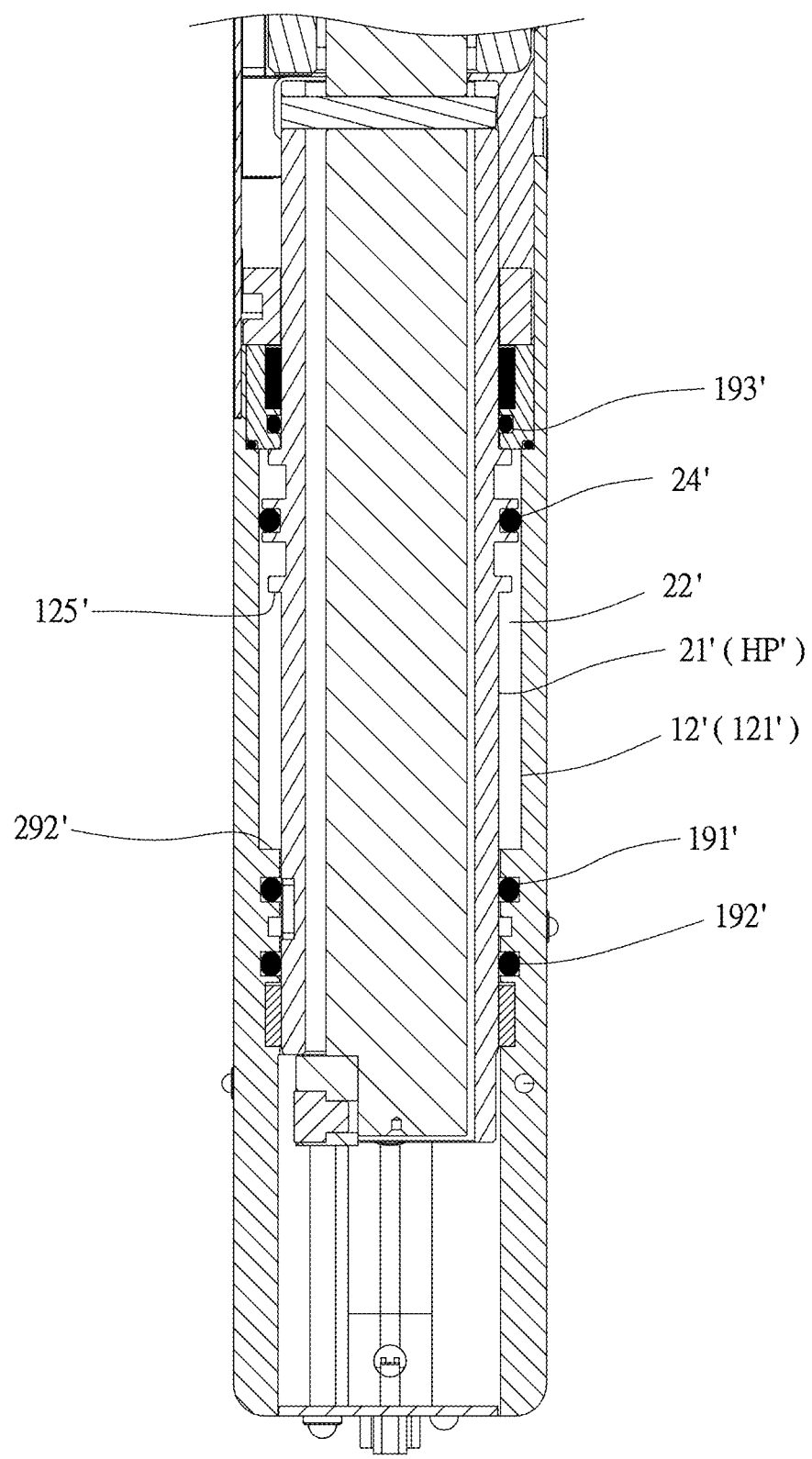
FIG. 21 is a partial cross-sectional view of the second preferred embodiment of the disclosure, taken at the same position as FIG. 11.

As shown in FIG. 16, to start the unsealing process, the second gas source 92 (shown in FIG. 1) provides the gas to be admitted into the third gas duct 53 and then into the two transverse piston cavities 14 to push the two transverse pistons 15 backward such that the two transverse pistons 15 backing from the forwarding position FP drive the two sub-pistons 151 backwards. As shown in FIG. 17, as soon as the two transverse pistons 15 retract to the backing position BP, the sub trigger slots 152 on the two sub-pistons 151 pass through the sub seal rings 142, allowing the gas to immediately enter the sub trigger slots 152 and then enter the fourth gas duct 54. As shown in FIG. 3, the gas in the fourth gas duct 54 enters the two auxiliary pistons cavities 16 to thereby push the two auxiliary pistons 26 downward, causing the pneumatic sleeve 21 and the axle 31 to descend to the lowest position LP. As soon as the two transverse pistons 15 retract to the backing position BP, the trigger 62 triggers the pressure relief valve 61 to open; thus, the gas between the body 11 and the rear of each of the two transverse pistons 15 escapes outward via the second gas duct 52 and the pressure relief valve 61. At this point in time, the axle 31 has finished performing the two-way movement that involves retracting followed by descending, allowing the valve plug (not shown) disposed at the axle 31 to separate from the valve port to finalize the unsealing process.

Therefore, the disclosure is effective in driving a valve component in two directions, using the trigger slot 211 of the pneumatic sleeve 21 and the sub trigger slot 152 on the two sub-pistons 151 to trigger the gas to enter a corresponding channel, and thus preventing frozen movements from occurring to the sealing process and unsealing process. Furthermore, the disclosure requires the axle 31 to ascend and then move transversely during the sealing process, and requires the axle 31 to retract transversely and then descend during the unsealing process, thereby achieving sequential movement.

As shown in FIG. 18 through FIG. 21, the second preferred embodiment of the disclosure provides a two-way driving device 10' for use with a valve component. The technical features that distinguish the second embodiment from the first embodiment are described below.

In the second embodiment, the vertical channel wall 121' further has a lower shoulder portion 125' and an upper seal ring 193' disposed above the upper shoulder portion 123'. The lower seal ring 191' is disposed below the lower shoulder portion 125'. The upper seal ring 193' and the bottom seal ring 192' prevent the air in the gap 22' from escaping to the outside of the body 11'. The pneumatic sleeve 21' further has a lower pressing portion 292' protruding outwards. When the pneumatic sleeve 21' is at the lowest position LP', the lower pressing portion 292' presses against the lower shoulder portion 125'.

The second embodiment dispenses with the two auxiliary pistons cavities and the two auxiliary pistons and has distinguishing technical features described below. The lower end 542' of the fourth gas duct 54' is in communication with the vertical channel 12' instead. When the pneumatic sleeve 21' is at the highest position HP', the lower end 542' of the fourth gas duct 54' is higher than the middle seal ring 24'. Therefore, during the unsealing process, after the two transverse pistons 15' have retracted to the backing position BP', the gas in the fourth gas duct 54' enters the gap 22' and thus drives the pneumatic sleeve 21' descending to the lowest position LP'. When the pneumatic sleeve 21' is at the highest position HP', the lower end 542' of the fourth gas duct 54' is higher than the middle seal ring 24' but lower than the upper seal ring 193'.

In the second embodiment, the body 11 has one sub-channel 141' and thus is in communication with the transverse piston cavity 14', and only one of the two transverse piston cavities 14' has the sub-piston 151'. The aforesaid structural features are conducive to the unsealing process such that, after the gas in the third gas duct (see FIG. 6 which illustrates the first embodiment) has entered the two transverse piston cavities 14', the backward movement of the transverse pistons 15' to the backing position BP' ensures that the gas in the third gas duct can enter the fourth gas duct 54' only via the sub-channel 141' of the transverse piston cavity 14' and then enter the gap 22' to push the pneumatic sleeve 21' downward to the lowest position LP' in the same way as disclosed in the first embodiment, because of the sub-piston 151' and the sub-channel 141' of the transverse piston cavity 14'.

The other structural features and achievable advantages of the second embodiment are substantially the same as the first embodiment and thus are, for the sake of brevity, not reiterated.

What is claimed is:

1. A two-way driving device for use with a valve component, comprising:
   a body having a vertical channel extending upward and downward, at least one transverse piston cavity extending forward and backward, at least one auxiliary piston cavity extending upward and downward, and a sub-channel extending forward and backward, the vertical channel being defined by a vertical channel wall, the at least one transverse piston cavity having therein a transverse piston movable between a forwarding position and a backing position, the sub-channel having therein a sub seal ring and being in communication with the at least one transverse piston cavity, the transverse piston having a sub-piston protruding into the sub-channel via a rear end thereof and slidingly penetrating the sub-channel because of the sub seal ring fitted around the sub-piston, and the vertical channel wall having a lower seal ring;
   a pneumatic sleeve having therein an oblong hollow core, having at least one auxiliary piston protruding upward into the at least one auxiliary piston cavity, disposed in the vertical channel, and being movable between a highest position and a lowest position, with the lower seal ring slidingly fitted around the pneumatic sleeve, with a gap formed between the pneumatic sleeve and the vertical channel wall to admit a gas, with a middle seal ring disposed annularly at the pneumatic sleeve, pressing against the vertical channel wall, and being higher than the lower seal ring;
   an axle disposed partially in the pneumatic sleeve and movable forward and backward to ascend or descend together with the pneumatic sleeve, wherein the axle has an exposed segment exposed from the pneumatic sleeve and the body from above;
   a transverse movement block fixedly disposed at the transverse piston in the at least one transverse piston cavity and thus movable forward and backward together with the transverse piston in the body, with the axle being capable of movably penetrating upward and downward the transverse movement block and thus moving forward and backward together with the transverse movement block;
   a first gas duct disposed at the body, having an end defined as an outer end in communication with an outside of the body, having another end defined as an inner end in communication with the vertical channel, wherein the inner end of the first gas duct is lower than the middle seal ring when the pneumatic sleeve is at the lowest position;

a second gas duct disposed at the body, having an end defined as a lower end in communication with the vertical channel, having another end defined as an upper end in communication with a space between the body and a rear of the transverse piston in the at least one transverse piston cavity, wherein the lower end of the second gas duct is lower than the lower seal ring;

a third gas duct disposed at the body, having an end defined as a front end in communication with a space between the body and a front of the transverse piston in the at least one transverse piston cavity, and having another end defined as an outer end in communication with the outside of the body;

a fourth gas duct disposed at the body, having an end defined as an upper end in communication with a front end of the sub-channel, having another end defined as a lower end in communication with the at least one auxiliary piston cavity, wherein the lower end of the fourth gas duct is higher than the at least one auxiliary piston when the pneumatic sleeve is at the highest position; and a pressure relief valve disposed at the body and being in communication with the outside of the body and the second gas duct, wherein the pneumatic sleeve has a trigger slot concavely formed and spatially in communication with the gap above the lower seal ring and a space below the lower seal ring so as to be in communication with the lower end of the second gas duct when the pneumatic sleeve is at the highest position, wherein the sub-piston has a sub trigger slot concavely formed and spatially in communication with the at least one transverse piston cavity behind the sub seal ring and the upper end of the fourth gas duct when the transverse piston in the at least one transverse piston cavity is at the backing position.

2. The two-way driving device for use with a valve component of claim 1, wherein the vertical channel wall has an upper shoulder portion protruding inwards and a bottom seal ring disposed below the lower seal ring, and the pneumatic sleeve has an upper pressing portion protruding outwards and disposed in the gap.

3. The two-way driving device for use with a valve component according to claim 2, wherein the inner end of the first gas duct is lower than the middle seal ring but higher than the lower seal ring when the pneumatic sleeve is at the lowest position.

4. The two-way driving device for use with a valve component according to claim 2, wherein the lower end of the second gas duct is lower than the lower seal ring but higher than the bottom seal ring.

5. The two-way driving device for use with a valve component according to claim 1, wherein a position-limiting rod is fixedly disposed in the pneumatic sleeve, with the axle being movably penetrated by the position-limiting rod to move forward and backward along the position-limiting rod and in the pneumatic sleeve, wherein the axle ascends or descends together with the pneumatic sleeve while being acted on by the position-limiting rod.

6. The two-way driving device for use with a valve component according to claim 1, wherein the at least one transverse piston cavity is in the number of two, with the two transverse piston cavities flanking the axle and each having therein a transverse piston, wherein the second gas duct and the third gas duct are branched and thus are in communication with the two transverse piston cavities.

7. The two-way driving device for use with a valve component according to claim 6, wherein one of the two transverse piston cavities has the sub-channel, and one of the two transverse pistons has the sub-piston.

8. The two-way driving device for use with a valve component according to claim 1, wherein the pressure relief valve has a trigger, with the trigger connected to the transverse piston in the at least one transverse piston cavity to move forward and backward together with the transverse piston, wherein, when the transverse piston is at the forwarding position, the trigger does not trigger the pressure relief valve and thus allows the pressure relief valve to shut, preventing the second gas duct from being in communication with the outside of the body, wherein, when the transverse piston is at the backing position, the trigger triggers the pressure relief valve and thus allows the pressure relief valve to open, allowing the second gas duct to be in communication with the outside of the body.

9. A two-way driving device for use with a valve component, comprising:

a body having a vertical channel extending upward and downward, at least one transverse piston cavity extending forward and backward, and a sub-channel extending forward and backward, the vertical channel being defined by a vertical channel wall, the at least one transverse piston cavity having therein a transverse piston capable of moving between a forwarding position and a backing position, the sub-channel having therein a sub seal ring and being in communication with the at least one transverse piston cavity, the transverse piston having a sub-piston protruding into the sub-channel via a front end thereof and slidingly penetrating the sub-channel because of the sub seal ring fitted around the sub-piston, the vertical channel wall having a lower seal ring;

a pneumatic sleeve having therein an oblong hollow core, disposed in the vertical channel, and being movable between a highest position and a lowest position, with the lower seal ring slidingly fitted around the pneumatic sleeve, wherein a gap is formed between the pneumatic sleeve and the vertical channel wall to admit a gas, and a middle seal ring is disposed annularly at the pneumatic sleeve, presses against the vertical channel wall, and is higher than the lower seal ring;

an axle disposed partially in the pneumatic sleeve and movable forward and backward to ascend or descend together with the pneumatic sleeve, wherein the axle has an exposed segment exposed from the pneumatic sleeve and the body from above;

a transverse movement block fixedly disposed at the transverse piston in the at least one transverse piston cavity and thus movable forward and backward together with the transverse piston in the body, wherein the axle is capable of movably penetrating upward and downward the transverse movement block to move forward and backward together with the transverse movement block;

a first gas duct disposed at the body, having an end defined as an outer end in communication with an outside of the body, and having another end defined as an inner end in communication with the vertical channel, wherein the inner end of the first gas duct is lower than the middle seal ring when the pneumatic sleeve is at the lowest position;

a second gas duct disposed at the body, having an end defined as a lower end in communication with the vertical channel, and having another end defined as an upper end in communication with a space between the body and a rear of the transverse piston in the at least one transverse piston cavity, wherein the lower end of the second gas duct is lower than the lower seal ring;

a third gas duct disposed at the body, having an end defined as a front end in communication with a space between the body and a front of the transverse piston in the at least one transverse piston cavity, and having another end defined as an outer end in communication with the outside of the body;

a fourth gas duct disposed at the body, having an end defined as an upper end in communication with a front end of the sub-channel, and having another end defined as a lower end in communication with the vertical channel, wherein the lower end of the fourth gas duct is higher than the middle seal ring when the pneumatic sleeve is at the highest position; and a pressure relief valve disposed at the body and being in communication with the outside of the body and the second gas duct, wherein the pneumatic sleeve has a trigger slot concavely formed and spatially in communication with the gap above the lower seal ring and a space below the lower seal ring so as to be in communication with the lower end of the second gas duct when the pneumatic sleeve is at the highest position, wherein the sub-piston has a sub trigger slot concavely formed and spatially in communication with the at least one transverse piston cavity behind the sub seal ring and the upper end of the fourth gas duct when the transverse piston in the at least one transverse piston cavity is at the forwarding position.

10. The two-way driving device for use with a valve component according to claim 9, wherein the vertical channel wall has an upper shoulder portion protruding inwards, a lower shoulder portion disposed below the upper shoulder portion, an upper seal ring disposed above the upper shoulder portion, and a bottom seal ring disposed below the lower seal ring, with the lower seal ring being disposed below the lower shoulder portion, with the upper and bottom seal rings preventing escape of air from the gap to the outside of the body, the pneumatic sleeve having an upper pressing portion and a lower pressing portion, the upper and lower pressing portions protruding outwards and being disposed in the gap.

11. The two-way driving device for use with a valve component according to claim 10, wherein the inner end of the first gas duct is lower than the middle seal ring but higher than the lower seal ring when the pneumatic sleeve is at the lowest position.

12. The two-way driving device for use with a valve component according to claim 10, wherein the lower end of the second gas duct is lower than the lower seal ring but higher than the bottom seal ring.

13. The two-way driving device for use with a valve component according to claim 10, wherein the lower end of the fourth gas duct is higher than the middle seal ring but lower than the upper seal ring when the pneumatic sleeve is at the highest position.

14. The two-way driving device for use with a valve component according to claim 9, wherein a position-limiting rod is fixedly disposed in the pneumatic sleeve, with the axle being movably penetrated by the position-limiting rod to move forward and backward along the position-limiting rod and in the pneumatic sleeve, wherein the axle ascends or descends together with the pneumatic sleeve while being acted on by the position-limiting rod.

15. The two-way driving device for use with a valve component according to claim 9, wherein the at least one transverse piston cavity is in the number of two, with the two transverse piston cavities flanking the axle and each having therein a transverse piston, wherein the second gas duct and the third gas duct are branched and thus are in communication with the two transverse piston cavities.

16. The two-way driving device for use with a valve component according to claim 15, wherein one of the two transverse piston cavities has the sub-channel, and one of the two transverse pistons has the sub-piston.

17. The two-way driving device for use with a valve component according to claim 9, wherein the pressure relief valve has a trigger, with the trigger connected to the transverse piston in the at least one transverse piston cavity to move forward and backward together with the transverse piston, wherein, when the transverse piston is at the forwarding position, the trigger does not trigger the pressure relief valve and thus allows the pressure relief valve to shut, preventing the second gas duct from being in communication with the outside of the body, wherein, when the transverse piston is at the backing position, the trigger triggers the pressure relief valve and thus allows the pressure relief valve to open, allowing the second gas duct to be in communication with the outside of the body.

* * * * *